United States Patent
Ishii et al.

(10) Patent No.: US 10,569,768 B2
(45) Date of Patent: Feb. 25, 2020

(54) INFORMATION PROCESSING APPARATUS, INFORMATION PROCESSING METHOD, AND NON-TRANSITORY RECORDING MEDIUM

(71) Applicant: Panasonic Intellectual Property Corporation of America, Torrance, CA (US)

(72) Inventors: Yasunori Ishii, Osaka (JP); Hiroaki Urabe, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 145 days.

(21) Appl. No.: 15/883,468

(22) Filed: Jan. 30, 2018

(65) Prior Publication Data

US 2018/0237006 A1   Aug. 23, 2018

(30) Foreign Application Priority Data

Feb. 22, 2017 (JP) .................................. 2017-031419
Sep. 27, 2017 (JP) .................................. 2017-186131

(51) Int. Cl.
*B60W 30/09* (2012.01)
*G06T 7/20* (2017.01)
(Continued)

(52) U.S. Cl.
CPC ............ *B60W 30/09* (2013.01); *B60W 30/08* (2013.01); *B60W 50/0225* (2013.01);
(Continued)

(58) Field of Classification Search
CPC ......... B60W 2420/42; B60W 2550/12; B60W 2550/402; B60W 2550/408; B60W 30/08;
(Continued)

(56) References Cited

U.S. PATENT DOCUMENTS

| | | | | |
|---|---|---|---|---|
| 5,959,572 A | * | 9/1999 | Higashimata | G08G 1/166 342/70 |
| 7,734,419 B2 | * | 6/2010 | Kondoh | B60K 26/021 701/301 |
| 2017/0072967 A1 | | 3/2017 | Fendt et al. | |

FOREIGN PATENT DOCUMENTS

| | | |
|---|---|---|
| DE | 102007041121 A1 | 3/2009 |
| DE | 102014210147 A1 | 12/2015 |

(Continued)

OTHER PUBLICATIONS

The Extended European Search Report dated Oct. 26, 2018 for European Patent Application No. 18156237.2.

*Primary Examiner* — Tyler J Lee
(74) *Attorney, Agent, or Firm* — Greenblum & Bernstein, P.L.C.

(57) ABSTRACT

An information processing apparatus of a vehicle obtains a sensing result from a sensor that senses the path of travel, and receives a result of sensing the path of travel of the vehicle from an external device such as another vehicle. It is determined whether the state of the vehicle at a specific point in time is a first state in which the sensing result obtained from the sensor meets a predetermined condition. If the state of the vehicle is determined to be the first state, first information for controlling the movement of the vehicle is generated based on the sensing result obtained from the sensor. If the state of the vehicle is determined not to be the first state, the first information is generated based on the sensing result received from the external device. Then, the first information is output.

15 Claims, 7 Drawing Sheets

(51) Int. Cl.
 *B60W 30/08* (2012.01)
 *B60W 50/02* (2012.01)
 *G06T 7/246* (2017.01)

(52) U.S. Cl.
 CPC .............. *G06T 7/246* (2017.01); *G06T 7/248* (2017.01); *B60W 2420/42* (2013.01); *B60W 2550/12* (2013.01); *B60W 2550/402* (2013.01); *B60W 2550/408* (2013.01); *G06T 2207/30252* (2013.01); *G06T 2207/30261* (2013.01)

(58) Field of Classification Search
 CPC ......... B60W 30/09; G06T 2207/30261; G06T 7/248
 See application file for complete search history.

(56) References Cited

FOREIGN PATENT DOCUMENTS

| | | |
|---|---|---|
| JP | 6-044499 | 2/1994 |
| JP | 2011-230621 | 11/2011 |

* cited by examiner

INFORMATION PROCESSING APPARATUS, INFORMATION PROCESSING METHOD, AND NON-TRANSITORY RECORDING MEDIUM

BACKGROUND

1. Technical Field

The present disclosure relates to a technique for assisting the movement of a moving object in accordance with results of sensing the path of travel of the moving object by sensors.

2. Description of the Related Art

Motor vehicles include devices such as various sensors, various actuators, and various electronic control units (ECUs). The various ECUs, which are connected to the actuators, in-vehicle sensors, and so on, are interconnected over an in-vehicle network and perform various types of information processing (such as data input/output and calculation). The various ECUs exchange data via the in-vehicle network, and each ECU cooperates with other ECUs to function as a vehicle control device that controls a vehicle such as a motor vehicle or to function as an information processing apparatus that performs information processing necessary for controlling the vehicle. For example, a plurality of ECUs cooperate with each other to implement the functions of an advanced driver assistance system (ADAS). The functions include, for example, a parking assist function, a lane-keeping assist function, and a collision avoidance assist function. As an example, in the collision avoidance assist function, the following ECUs cooperate with each other: an ECU connected to the in-vehicle sensors to detect obstacles in the path of travel, an ECU operating as an information processing apparatus that determines the potential risk of collision with an obstacle and that issues instructions for emergency braking control, and an ECU operating as a vehicle control device that controls brakes in accordance with the instructions for emergency braking control.

In the advanced driver assistance system and the like, for example, an obstacle is detected by using sensing (such as monitoring) results obtained by the in-vehicle sensors (such as radars and image sensors) to activate functions for assisting the travel of a vehicle (such as the collision avoidance assist function). Thus, for example, less accurate or incorrect sensing results obtained by the in-vehicle sensors may inhibit appropriate assistance of the travel of the vehicle. For example, a system for providing travel assistance by using image processing based on images generated by an image sensor that captures the scene ahead in the direction of travel of a vehicle to detect the size, position, and so on of an obstacle present ahead of the vehicle may fail to appropriately detect an obstacle in some cases such as immediately after the vehicle enters a tunnel. If a vehicle enters a tunnel at a somewhat high speed in a condition where the lighting inside the tunnel is very dark compared with outside the tunnel (such as during the daytime period under fair weather conditions), an image sensor mounted on the vehicle may delay the adjustment of sensitivity even using the automatic sensitivity adjustment function and generate unclear images immediately after the vehicle has entered the tunnel, which leads to inappropriate detection of obstacles.

In the related art, there is a known technique for a travel security device for avoiding contact between a subject vehicle and an obstacle ahead of the subject vehicle, in which control logic is changed such that for a predetermined time period immediately after the subject vehicle enters a tunnel, risk mitigation measures can be taken earlier than in other cases (see Japanese Unexamined Patent Application Publication No. 6-44499). This technique involves taking risk mitigation measures early to address a reduction in the responsiveness of the driver during a driving operation due to the delayed adjustment of the driver's eye to a rapid change in brightness immediately after the vehicle enters a tunnel.

The technique disclosed in Japanese Unexamined Patent Application Publication No. 6-44499 provides measures to be taken early to address the approach to an obstacle. Even with this technique, a reduction in the accuracy or correctness of sensing performed by an in-vehicle sensor may be difficult to handle appropriately.

SUMMARY

One non-limiting and exemplary embodiment provides an information processing apparatus for assisting the appropriate movement (travel) of a moving object even in a situation where it is difficult for a sensor (for example, an in-vehicle sensor) mounted on the moving object to perform appropriate sensing of the path of travel of the moving object. The information processing apparatus for assisting the travel of a moving object is, for example, an information processing apparatus mountable on the moving object (such as a vehicle) or an information processing apparatus mountable on another moving object (such as another vehicle) that is different from the moving object. Other non-limiting and exemplary embodiments provide an information processing method for appropriately controlling the travel of a moving object such as a vehicle even in a situation where it is difficult for a sensor mounted on the moving object to perform appropriate sensing of the path of travel of the moving object, and a non-transitory recording medium storing a program for causing a computer (for example, an on-board computer such as an ECU) mounted on the moving object to perform the information processing method.

In one general aspect, the techniques disclosed here feature an apparatus including a processor and a memory storing thereon a computer program, which when executed by the processor, causes the processor to perform operations including obtaining a first sensing result from a sensor that, when mounted on a moving object, senses a path of travel of the moving object; receiving a second sensing result regarding the path of travel of the moving object from an external device outside the moving object; determining whether a state of the moving object at a specific point in time is a first state in which the first sensing result meets a predetermined condition; generating first information for controlling movement of the moving object in accordance with the first sensing result when it is determined that the state of the moving object at the specific point in time is the first state, or generating the first information in accordance with the second sensing result received from the external device when it is determined that the state of the moving object at the specific point in time is not the first state; and outputting the first information.

According to an aspect of the present disclosure, it may be possible to assist the travel of a vehicle even in a situation where, for example, it is difficult for an in-vehicle sensor to perform appropriate sensing of the path of travel of the vehicle.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
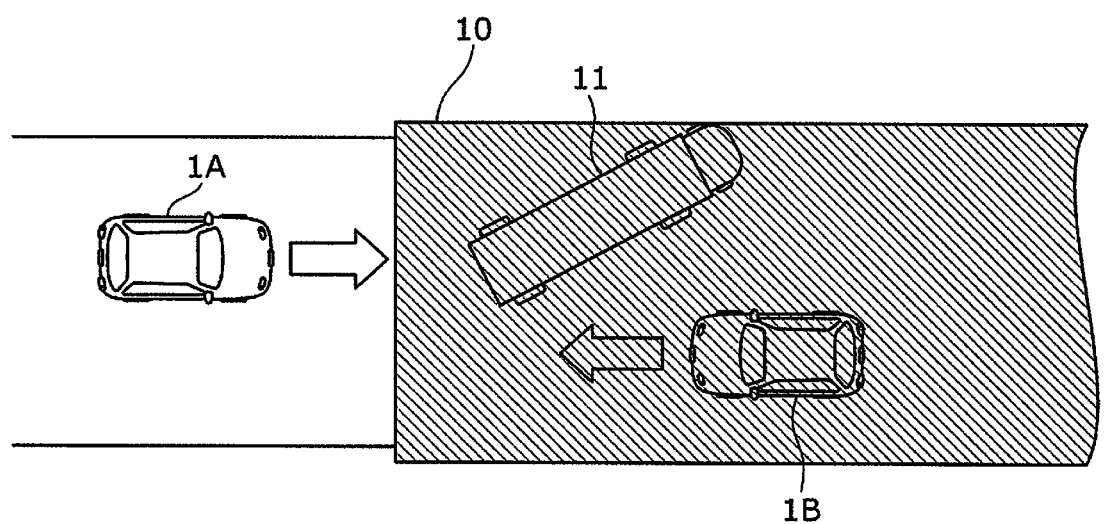
FIG. 1 is a diagram illustrating traveling vehicles and so on in the vicinity of the entrance/exit of a tunnel.

To assist the travel of a vehicle, it is useful to generate travel assistance information for assisting the travel of the vehicle (such as information on an obstacle in the path of travel or information on road surface conditions) on the basis of the results of sensing the path of travel of the vehicle by sensors (in-vehicle sensors) mounted on the vehicle, and to present the travel assistance information to the user (driver) of the vehicle by, for example, displaying the travel assistance information on a display or transmit the travel assistance information to a vehicle control device (such as ECUs that control the engine, brakes, steering wheel, and so on) as a control signal. In a situation with low-accuracy sensing of the path of travel of a vehicle by in-vehicle sensors, however, it may be difficult to appropriately detect obstacles in the path of travel (such as pedestrians, other vehicles, rocks, objects falling from vehicles, or other articles), road surface conditions (such as potholes and bumps, puddles, or icy spots), a fire on the path of travel, or any other event, which may make it difficult to appropriately assist the travel of the vehicle. For example, a vehicle equipped with an advanced driver assistance system for detecting an obstacle or the like by using image processing based on images generated by an image sensor (camera) that captures the scene on the path of travel, such as the scene ahead of the vehicle, enters a tunnel at a speed of 60 km per hour in certain conditions such as during the daytime period under fair weather conditions. In this case, the image sensor, which experiences a rapid change to a darker lighting environment inside the tunnel immediately after the vehicle enters the tunnel, may delay the adjustment of sensitivity and therefore temporarily generate low-quality images. Immediately after the vehicle exits the tunnel, the image sensor also experiences a rapid change to brighter lighting and may temporarily generate low-quality images. To address such difficulties, an information processing method is achieved, such as a control method in which when a low-quality sensing result is obtained from an in-vehicle sensor, such as when a vehicle passes in the vicinity of a tunnel entrance/exit, a sensing result is received from outside the vehicle and is used to assist the travel of the vehicle.

In information processing apparatus or the like according to an embodiment of the present disclosure, the information processing method described above is used to determine whether the vehicle is in a state (normal state) in which a sensing result meeting predetermined criteria is obtainable from an in-vehicle sensor that senses the path of travel of the vehicle. If the vehicle is not in the normal state, a sensing result regarding the path of travel of the vehicle is received from outside the vehicle (such as from an oncoming vehicle, a preceding vehicle, or a roadside device) and is used to assist the travel of the vehicle. Thus, accidents caused by the generation of inappropriate travel assistance information when a sensing result obtained by an in-vehicle sensor has low quality, such as when the vehicle travels in the vicinity of a tunnel entrance/exit, are less likely to occur. While the assistance of the travel of a vehicle will be mainly described, an information processing method in which when a low-quality sensing result is obtained from an in-vehicle sensor, a sensing result is received from outside the vehicle and is used to assist the travel of the vehicle is also applicable to moving objects other than a vehicle (such as a moving robot).

An apparatus according to an aspect of the present disclosure includes a processor and a memory storing thereon a computer program, which when executed by the processor, causes the processor to perform operations including obtaining a first sensing result from a sensor that, when mounted on a moving object, senses a path of travel of the moving object; receiving a second sensing result regarding the path of travel of the moving object from an external device outside the moving object; determining whether a state of the moving object at a specific point in time is a first state in which the first sensing result meets a predetermined condition; generating first information for controlling movement of the moving object in accordance with the first sensing result when it is determined that the state of the moving object at the specific point in time is the first state, or generating the first information in accordance with the second sensing result received from the external device when it is determined that the state of the moving object at the specific point in time is not the first state; and outputting the first information. The predetermined condition may be a criterion used to identify whether the first sensing result is information appropriately indicating the actual state of the target of sensing, and may be specified such that the predetermined condition is met when the actual state is appropriately indicated or the predetermined condition is not met otherwise. The determining may be based on the obtained first sensing result obtaining unit (by, for example, when the moving object is a vehicle, analyzing an image serving as a sensing result obtained by an in-vehicle image sensor) or may be performed, by estimation, by using any other method (such as detecting the passage of the vehicle in the vicinity of a tunnel entrance/exit, where the accuracy of sensing performed by the image sensor is temporarily reduced due to a rapid change in brightness, on the basis of position measurement information, map information, or the like). With this configuration, when the moving object is in the first state, that is, when the moving object is in in a normal state, a sensing result obtained by a sensor such as an in-vehicle sensor is appropriate and is used, which enables appropriate movement assistance. When the moving object is not in the first state, that is, when the moving object is not in the normal state, a sensing result that is obtained externally is used instead of the sensing result obtained by the sensor or is used preferentially, which enables appropriate movement assistance.

The sensor may include an image sensor, and the first sensing result or the second sensing result may include image information.

The determining may include determining whether the moving object moves between two consecutive areas having a difference in brightness therebetween of greater than or equal to a predetermined level. For example, the determining whether the moving object moves between the two consecutive areas may include determining, based on a result of measuring a position of the moving object and position information indicating positions at which the two consecutive areas are located, whether the moving object is approaching a boundary between the two consecutive areas.

With this configuration, whether the moving object is traveling on portions with largely different brightness levels such as in the vicinity of a tunnel entrance/exit can be determined in a comparatively simple way by using the position of the moving object. Thus, in accordance with the result of the determination, the apparatus can appropriately select information (sensing result) used to generate first information.

Alternatively, the determining whether the moving object moves between the two consecutive areas may include determining whether a boundary between the two consecutive areas appears in an image indicated by image information obtained from the image sensor.

With this configuration, it can be determined that the moving object moves across a boundary between two areas by using an existing configuration, namely, by using an image sensor. As a result, an increase in cost can be suppressed. In addition, when the moving object moves across two consecutive areas having a difference in brightness therebetween of greater than or equal to a predetermined level (for example, when the moving object moves across the areas inside and outside a tunnel), the apparatus, which is mounted on the moving object, generates the first information in accordance with a sensing result received from an external device even if the sensor is not able to temporarily perform sensing appropriately, which enables appropriate movement assistance. That is, if the moving object is not in the first state, the apparatus generates the first information in accordance with a sensing result from the external device, which enables appropriate movement assistance.

For example, the determining may include determining whether the first sensing result obtained from the image sensor meets the predetermined condition. With this configuration, the determination is based on an actual sensing result obtained by an image sensor, which enables appropriate determination of whether to use information received from an external device to generate first information.

For example, the determining may include comparing a result of statistical processing of a pixel value of an image generated by the image sensor as the first sensing result with a threshold. With this configuration, it can be determined whether an image captured by an image sensor mounted on the moving object has a sufficient level of quality (such as accuracy) to detect an obstacle or the like in the path of travel of the moving object.

For example, the predetermined condition may not be met when a predetermined number of pixel values of an image generated by the image sensor fall within a predetermined range, and may be met when the predetermined number of pixel values exceed the predetermined range. With this configuration, for example, if it is difficult to obtain an image having sufficient resolution through an imaging operation, the state of the moving object is determined not to be the first state, and first information is generated in a manner different from that in the first state (for example, on the basis of a sensing result received from an external device). This enables appropriate movement assistance in accordance with the situation.

For example, when it is determined that the state of the moving object at the specific point in time is not the first state, the generating may generate the first information without using the first sensing result. With this configuration, if the state of the moving object at the specific point in time is the first state (for example, a normal state), assistance of the movement of the moving object is performed based on a sensing result obtained by a sensor, and if the state of the moving object at the specific point in time is not the first state, the sensing result obtained by the sensor is not used to generate first information, which can prevent the occurrence of harmful effects caused by a sensing result obtained by a sensor when the state of the moving object at the specific point in time is not the first state, such as the erroneous detection or the missing of the detection of an obstacle in the path of travel of the moving object, road surface conditions, and so on.

For example, when it is determined that the state of the moving object at the specific point in time is not the first state, the generating may generate the first information in accordance with the second sensing result and the first sensing result in such a manner that an effect of the first sensing result on the first information is reduced compared with when it is determined that the state of the moving object at the specific point in time is the first state. With this configuration, if the state of the moving object at the specific point in time is not the first state (for example, a normal state), first information can be generated by using both a sensing result obtained by a sensor and a sensing result received from an external device, with a reduction in the occurrence of harmful effects such as the erroneous detection or the missing of the detection of an obstacle in the path of travel of the moving object, road surface conditions, and so on.

For example, the operations may further include transmitting a request to transmit the second sensing result before or while the moving object moves between two consecutive areas having a difference in brightness therebetween of greater than or equal to a predetermined level. With this configuration, the apparatus can provide a trigger for the transmission of a sensing result to an external device, if necessary. This eliminates the need for the external device to repeatedly transmit a sensing result all the time and eliminates the need for a configuration for determining the timing at which the external device is to transmit a sensing result.

A method according to another aspect of the present disclosure includes obtaining a first sensing result from a sensor that senses a path of travel of a moving object; receiving a second sensing result regarding the path of travel of the moving object from an external device outside the moving object; and generating first information for controlling movement of the moving object in accordance with the first sensing result when a state of the moving object at a specific point in time is a first state in which the first sensing result meets a predetermined condition, or generating the first information in accordance with the second sensing result when the state of the moving object at the specific point in time is not the first state. With this configuration, in a first state in which a sensing result from a sensor meets a predetermined condition, that is, in a state in which the sensing result is appropriate, the sensing result is used, and in a state in which the sensing result does not meet a predetermined condition, that is, in a state in which the sensing result is not appropriate, a sensing result received from an external device is used, which enables appropriate assistance of the movement of the moving object.

A non-transitory recording medium according to still another aspect of the present disclosure stores thereon a computer program, which when executed by a processor, causes the processor to perform operations including obtaining a first sensing result from a sensor that senses a path of travel of a moving object; receiving a second sensing result regarding the path of travel of the moving object from an external device outside the moving object; and generating first information for controlling movement of the moving object in accordance with the first sensing result when a state of the moving object at a specific point in time is a first state in which the first sensing result meets a predetermined condition, or generating the first information in accordance with the second sensing result when the state of the moving object at the specific point in time is not the first state. The program is installed into a computer or the like (a device including a processor) mounted on the moving object, and the processor (microprocessor) executes the program, thereby implementing appropriate assistance of the movement of the moving object.

An apparatus according to still another aspect of the present disclosure includes a processor and a memory storing thereon a computer program, which when executed by the processor, causes the processor to perform operations including obtaining a first sensing result regarding an environment external to a first moving object from a first sensor in the first moving object or from a second sensor near the first moving object; determining whether a state of a second moving object at a specific point in time is a first state in which a second sensing result obtained from a third sensor that, when mounted on the second moving object, senses a path of travel of the second moving object meets a predetermined condition; and transmitting the first sensing result in response to determining that the state of the second moving object at the specific point in time is not the first state. With this configuration, in a state in which the third sensor mounted on the second moving object fails to perform appropriate sensing, that is, in a state in which a sensing result obtained by the third sensor does not meet the predetermined condition, the second moving object (such as an information processing apparatus in the second moving object) can receive a sensing result from the first moving object, which enables appropriate assistance of the movement of the second moving object using the received sensing result.

For example, the obtaining may obtain the first sensing result regarding the path of travel of the second moving object from the first sensor or from the second sensor. The determining may include determining whether the second moving object moves across two consecutive areas having a difference in brightness therebetween of greater than or equal to a predetermined level. The transmitting may transmit the first sensing result in response to the first moving object approaching a boundary between the two consecutive areas. This configuration enables the second moving object to receive a sensing result from the first moving object without transmitting a request.

For example, the determining may include determining whether a request has been received from the second moving object to transmit the first sensing result. The transmitting may transmit the first sensing result in response to receipt of the request from the second moving object. This configuration enables the apparatus, which is mounted on the first moving object, to efficiently assist the travel of the second moving object.

It should be noted that general or specific embodiments may be implemented as a system, a method, an integrated circuit, a computer program, a computer-readable recording medium such as a compact disc read-only memory (CD-ROM), or any selective combination thereof.

In the following, an information processing apparatus or the like that uses an information processing method according to an embodiment will be described with reference to the drawings. The embodiments are specific examples of the present disclosure. Thus, numerical values, constituent elements, arrangements and connection forms of the constituent elements, steps, the order of the steps, and so on in the following embodiments are merely examples and are not intended to limit the present disclosure. The constituent elements mentioned in the following embodiments are optionally added constituent elements unless they are specified in the independent claims. In addition, the drawings are schematic and are not representative of exact proportions or dimensions.

First Embodiment

In the following, an information processing apparatus or the like according to an embodiment of the present disclosure will be described with reference to the drawings. The information processing apparatus or the like is mounted on a vehicle and constitutes an advanced driver assistance system.

1.1 Changes in Situation During Travel of Vehicle

First, an example will be described with reference to FIG. 1 in which the state of a vehicle changes from a normal state (a state in which a sensing result meeting predetermined criteria is obtainable from an in-vehicle sensor) to a state different from the normal state during travel. FIG. 1 is a schematic diagram of a tunnel, viewed in perspective from above, and illustrates traveling vehicles and so on in the vicinity of the entrance/exit of the tunnel. The predetermined criteria described above are also referred to as predetermined conditions, and the normal state is a first state in which a sensing result obtained from a sensor meets the predetermined conditions.

In FIG. 1, a vehicle 1A, which is traveling outside a tunnel 10, is approaching the entrance/exit of the tunnel 10 to enter the tunnel 10. During the daytime period under fair weather conditions, it is presumable that the lighting outside the tunnel 10 is bright whereas the lighting inside the tunnel 10 is dark. In the tunnel 10, a vehicle 1B, which is an oncoming vehicle, is traveling in a direction opposite to the direction in which the vehicle 1A is traveling. An obstacle 11, such as a vehicle (for example, a heavy lorry) that has been stopped due to the failure or the like, is present in the tunnel 10 ahead of the vehicle 1A. The vehicle 1A is equipped with an advanced driver assistance system. The vehicle 1A performs image processing based on images obtained by capturing the scene on the path of travel of the vehicle 1A using an image sensor (camera) serving as an in-vehicle sensor to detect obstacles in the path of travel, road surface conditions, and so on and generates travel assistance information in accordance with the detection result. The travel assistance information is used to control the vehicle or to provide a notification to the user (driver), for example. The image sensor of the vehicle 1A captures images with normal sensitivity when the vehicle 1A is traveling outside the tunnel 10, and captures images with higher sensitivity by using an automatic sensitivity adjustment function when the vehicle 1A is traveling in dark places such as in the tunnel 10. The travel assistance information described above is information for controlling the movement of a moving object such as a vehicle and is also referred to as movement assistance information or first information.

Immediately after the vehicle 1A enters the tunnel 10, because of the delay of adjustment with the automatic sensitivity adjustment function of the image sensor of the vehicle 1A, the image sensor may temporarily generate low-quality images such as images containing pixels with very low luminance. Low-quality images may inhibit appropriate detection of obstacles or the like in the path of travel. In the example illustrated in FIG. 1, if the vehicle 1A is traveling at somewhat high speeds, a rapid change in brightness immediately after the vehicle 1A enters the tunnel 10 may cause a delay in detecting the obstacle 11 based on a sensing result obtained by the image sensor of the vehicle 1A, which can lead to an accident. The vehicle 1A and the vehicle 1B have a vehicle-to-vehicle communication function, and the vehicle 1A has a function of preventing the occurrence of such an accident by, for example, communicating with the vehicle 1B.

1.2 System Configuration of Vehicle

In the following, the configuration of the vehicle 1A and the vehicle 1B will be described, with a focus on, mainly, a configuration for assisting the travel of the vehicle 1A (such as sensing the path of travel of the vehicle 1A).

Figure 2:
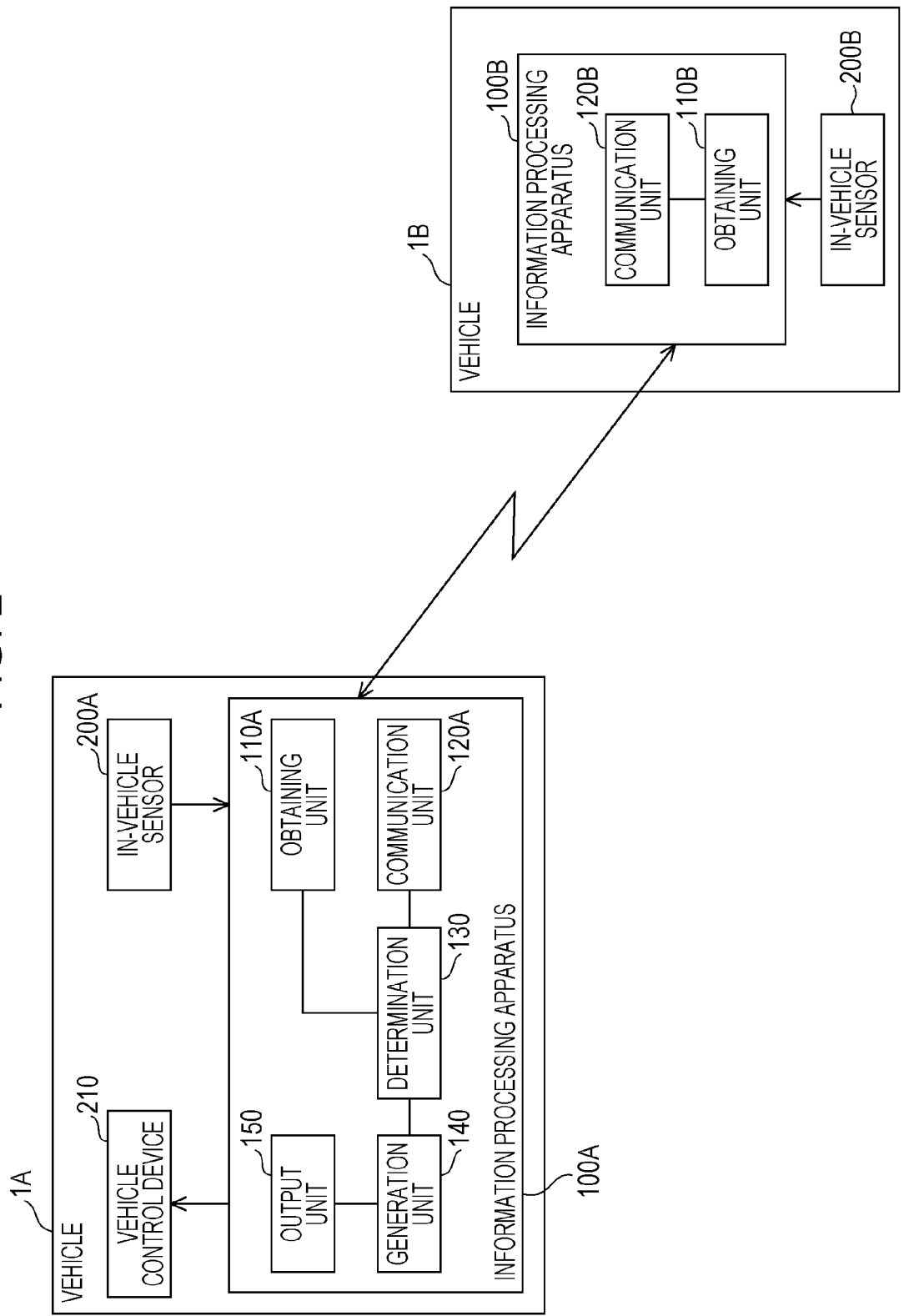
FIG. 2 is a configuration diagram of vehicles including information processing apparatuses that communicate with each other.

FIG. 2 illustrates the configuration of the vehicle 1A and the vehicle 1B. The vehicle 1A and the vehicle 1B include information processing apparatuses that communicate with each other.

As illustrated in FIG. 2, the vehicle 1A includes an information processing apparatus 100A, an in-vehicle sensor 200A, and a vehicle control device 210.

The in-vehicle sensor 200A includes one or more sensors that sense the path of travel of the vehicle 1A. The in-vehicle sensor 200A may include any number of sensors. The path of travel is sensed using, for example, an image sensor, a radar, or a Light Detection and Ranging or Laser Imaging Detection and Ranging (LIDAR) device. Here, the description will be given taking an example in which the in-vehicle sensor 200A includes an image sensor (camera). The in-vehicle sensor 200A senses the path of travel of the vehicle 1A (for example, the path ahead of the vehicle 1A) (the image sensor captures a scene and generates an image) to obtain a sensing result (such as an image) and forwards the sensing result to the information processing apparatus 100A.

The information processing apparatus 100A is constituted by a single electronic control unit (ECU) or a plurality of ECUs connected to each other via an in-vehicle network (such as a bus) and has a function of generating travel assistance information on the basis of, for example, the sensing result obtained by the in-vehicle sensor 200A and outputting the travel assistance information.

The vehicle control device 210 is constituted by a single ECU or a plurality of ECUs (for example, ECUs for controlling the engine, brakes, steering wheel, and so on of the vehicle 1A). Upon receipt of a control signal from the information processing apparatus 100A, for example, the vehicle control device 210 drives actuators connected to some of the ECUs in accordance with the control signal to controls the vehicle 1A.

The ECUs are each a device including digital circuits such as a processor (microprocessor) and a memory, analog circuits, a communication circuit, an input/output interface, and so on. The memory, such as a read-only memory (ROM) or a random access memory (RAM), is capable of storing a program (computer program as software) to be executed by the processor. For example, the processor operates in accordance with the program (computer program), thereby allowing the ECU to implement various functions such as the functions of the information processing apparatus 100A or the vehicle control device 210. The computer program is created by combining a plurality of command codes indicating instructions to be provided to the processor to implement a predetermined function. Each ECU is capable of exchanging information with other ECUs in the same vehicle via an in-vehicle network such as a bus. Some ECUs included in the information processing apparatus 100A have a function (such as a vehicle-to-vehicle communication function or a road-vehicle communication function) of communicating with a device (external device) located outside the vehicle 1A. Other ECUs included in the information processing apparatus 100A include devices that present information to a user, such as a display.

As illustrated in FIG. 2, the information processing apparatus 100A includes, as components for implementing a function of generating and outputting travel assistance information, an obtaining unit 110A, a communication unit 120A, a determination unit 130, a generation unit 140, and an output unit 150.

The obtaining unit 110A is implemented by devices in an ECU, such as an input interface that receives a sensing result from the in-vehicle sensor 200A and a processor that executes a program, and obtains a sensing result from the in-vehicle sensor 200A. The sensing result obtained by the obtaining unit 110A includes an image generated by the image sensor. Image processing based on the image obtained by the obtaining unit 110A enables the detection of an obstacle in the path of travel of the vehicle 1A, road surface conditions, and so on.

The communication unit 120A is implemented by devices in an ECU, such as a processor that executes a program and a communication circuit, and communicates with an external device located outside the vehicle 1A to receive a sensing result regarding the path of travel of the vehicle 1A. For example, the communication unit 120A transmits a transmission request for a sensing result (a sensing result regarding the path of travel of the vehicle 1A) to an external device located near the vehicle 1A by using short-range wireless communication technology or the like, and receives a sensing result transmitted from the external device (for example, an information processing apparatus 100B of the vehicle 1B, which is an oncoming vehicle ahead of the vehicle 1A) in response to the transmission request. The transmission request includes, for example, information identifying the vehicle 1A and information on the position of the vehicle 1A (for example, information generated by a position measurement sensor or the like in the in-vehicle sensor 200A for measuring the position of the vehicle 1A). Examples of the position measurement sensor include a Global Positioning System (GPS) receiver and a gyro sensor. The communication unit 120A transmits a transmission request to an external device located near the vehicle 1A when the vehicle 1A moves between two consecutive areas having a difference in brightness therebetween of greater than or equal to a predetermined level (for example, when the vehicle 1A enters an area in the tunnel 10 from an area outside the tunnel 10 through a boundary between bright and dark areas). The external device may be a moving device (for example, the information processing apparatus 100B of the vehicle 1B, which is an oncoming vehicle, or an on-board device of a preceding vehicle traveling in the same direction as the vehicle 1A) or a non-movable device (such as a roadside device placed in the vicinity of the boundary between the bright and dark areas). Here, the description will be given taking an example in which upon receipt of the transmission request, the information processing apparatus 100B of the vehicle 1B transmits a sensing result regarding the path of travel of the vehicle 1A, which is ahead of the vehicle 1B, to the information processing apparatus 100A of the vehicle 1A. A vehicle preceding the vehicle 1A, the vehicle 1B, a vehicle following the vehicle 1B, or any other nearby vehicle (i.e., an on-board device of such a vehicle) may transfer the transmission request from the vehicle 1A to any other vehicle, and the vehicle that has received the transferred transmission request may transmit a sensing result regarding the path of travel of the vehicle 1A to the vehicle 1A directly or indirectly via any other vehicle having a transfer function. It is useful that the communication unit 120A transmits the transmission request within a period before and after the vehicle 1A passes through a boundary between areas having a large difference in brightness therebetween. Here, the description will be given taking an example in which, for example, the transmission request is transmitted immediately after the vehicle 1A passes a boundary between bright and dark areas, such as immediately after the vehicle 1A passes the entrance/exit of the tunnel 10. Alternatively, for example, the transmission request may be transmitted immediately before the vehicle 1A passes the entrance/exit of the tunnel 10 (such as several seconds or several tens of seconds before passing). In this embodiment, in this way, the communication unit 120A transmits the transmission request for a sensing result regarding the path of travel of the vehicle 1A to an external device before or while the vehicle 1A moves between two consecutive areas having a difference in brightness therebetween of greater than or equal to a predetermined level.

The determination unit 130 is implemented by devices in an ECU, such as a processor that executes a program, and determines whether the state of the vehicle 1A is a normal state in which a sensing result meeting predetermined criteria is obtainable from the in-vehicle sensor 200A. In other words, the determination unit 130 determines whether the state of the vehicle 1A at a specific point in time is a first state in which a sensing result obtained from a sensor meets predetermined conditions. For example, the determination unit 130 may determine that the vehicle 1A is not in the normal state when the vehicle 1A is moving between two consecutive areas having a difference in brightness therebetween of greater than or equal to a predetermined level over the boundary between the areas. That is, the determination of the first state includes determining whether the vehicle 1A moves between two consecutive areas having a difference in brightness therebetween of greater than or equal to a predetermined level. The predetermined criteria are criteria used to determine whether the sensing result is information that appropriately indicates the actual state of the target of sensing. If the sensing result is appropriate, the predetermined criteria are met; otherwise, the predetermined criteria are not met. The predetermined criteria are evaluation metrics such as correctness, accuracy, and reliability, and any evaluation technique may be used. By way of example, the predetermined criteria are not met when the luminance distribution of pixels of an image that is a sensing result obtained by an image sensor serving as the in-vehicle sensor 200A is generally too bright (for example, each of the pixels has a luminance of 90% or more, with the available luminance range being assumed to be 0 to 100%) or too dark (for example, each of the pixels has a luminance of 10% or less, with the available luminance range being assumed to be 0 to 100%, for example), or the predetermined criteria are met otherwise.

The determination unit 130 may determine whether the vehicle 1A is in the normal state on the basis of a sensing result (for example, an image) from the in-vehicle sensor 200A (for example, an image sensor), which is actually obtained by the obtaining unit 110A, by using, for example, image analysis or the like or may determine, by estimation, whether the vehicle 1A is in the normal state by using any other method (such as detecting the close approach of the vehicle 1A to the entrance/exit of the tunnel 10). Here, the description will be given, assuming that the determination unit 130 analyzes an image generated by the image sensor, which is obtained by the obtaining unit 110A, to determine whether the vehicle 1A is in the normal state on the basis of whether a sensing result (an image) meeting predetermined criteria has been obtained. For instance, the determination unit 130 compares a result of statistical processing of each pixel value of an image obtained by the obtaining unit 110A from the image sensor with a threshold to identify whether a sensing result meeting predetermined criteria has been obtained. As an example, the predetermined criteria are not met when a predetermined number of pixel values of an image generated by the image sensor fall within a predetermined range, and are met when the pixel values exceed the predetermined range. As a more specific example, the predetermined criteria are not met when substantially all (such as greater than or equal to 95% or greater than or equal to about 90%) of the pixels of an image generated by the image sensor have luminance values as pixel values in a predetermined narrow range (a narrow range such as the range of 0 to 20 or 235 to 255, where the luminance values are represented by values within a range of 0 to 255), and are met when the pixel values are distributed to a wider range than the predetermined narrow range. In this case, the predetermined criteria are not met when the luminance values of substantially all of the pixels are less than or equal to 20 or are greater than or equal to 250. For example, when the luminance values are represented by values within a range of 0 to 255, the following may be specified: As a result of statistical processing, such as calculation of the average or median of the pixel values (luminance values) of the respective pixels, if the calculation result is less than or equal to 20 or is greater than or equal to 250, the predetermined criteria are not met; otherwise, the predetermined criteria are met. While the image sensor has an automatic sensitivity adjustment function, a reduction in image quality such as an excessively bright image or an excessively dark image may temporarily occur due to the delay of adaptation to a change in brightness or the like. Accordingly, the determination unit 130 determines whether the predetermined criteria are met for an image by, for example, comparing each pixel value with a threshold to determine whether the vehicle 1A in the normal state.

In this embodiment, in this way, the determination of the first state includes determining whether a sensing result meeting predetermined conditions has been obtained from the image sensor. Specifically, the determination of the first state includes comparing a result of statistical processing of each pixel value of an image generated as a sensing result obtained by the image sensor with a threshold. The predetermined conditions are not met when a predetermined number of pixel values of an image generated by the image sensor fall within a predetermined range, and are met when the pixel values exceed the predetermined range.

The generation unit 140 is implemented by devices in an ECU, such as a processor that executes a program. If the determination unit 130 determines that the vehicle 1A is in the normal state, the generation unit 140 generates travel assistance information on the basis of a sensing result obtained from the in-vehicle sensor 200A via the obtaining unit 110A. If the determination unit 130 determines that the vehicle 1A is not in the normal state, the generation unit 140 generates travel assistance information on the basis of a sensing result received from an external device (for example, the information processing apparatus 100B of the vehicle 1B), rather than on the basis of a sensing result obtained from the in-vehicle sensor 200A. As a specific example, if the vehicle 1A is not in a normal state in which a sensing result meeting the predetermined criteria is obtainable from the in-vehicle sensor 200A, for example, immediately after the vehicle 1A enters the tunnel 10, an image serving as a sensing result obtained by the in-vehicle sensor 200A has low quality. Therefore, the sensing result is not used but a sensing result transmitted from the vehicle 1B or the like in response to a transmission request is received and used to generate travel assistance information. Accordingly, even if a sensing result from the in-vehicle sensor 200A has low accuracy, the erroneous detection or the missing of the detection of an obstacle in the path of travel of the vehicle 1A, road surface conditions, and so on can be prevented. When the vehicle 1A is in the normal state, the generation unit 140 may or may not use a sensing result received from the external device to generate travel assistance information. If a sensing result received from the external device is used when the vehicle 1A is in the normal state, it is useful that a sensing result from the in-vehicle sensor 200A is preferentially used so long as the sensing result from the in-vehicle sensor 200A meets the predetermined criteria.

In this embodiment, in this way, if the determination unit 130 determines that the state of the vehicle 1A at a specific point in time is the first state, the generation unit 140 generates first information for controlling the movement of the vehicle 1A on the basis of a sensing result obtained from a sensor. If the determination unit 130 determines that the state of the vehicle 1A at the specific point in time is not the first state, the generation unit 140 generates the first information on the basis of a sensing result received from the external device.

The output unit 150 is implemented by devices in an ECU, such as an output interface, and outputs the travel assistance information generated by the generation unit 140 from the information processing apparatus 100A. For example, the output unit 150 outputs travel assistance information (for example, information such as the distance to an obstacle in the path of travel and the type of the obstacle) via a user interface device such as a display to present (e.g., display) information to the user. For example, the output unit 150 forwards (or transmits) the travel assistance information to the vehicle control device 210 as a control signal to cause the vehicle control device 210 to perform control related to the travel of the vehicle 1A (to control the engine, brakes, steering wheel, and so on).

As illustrated in FIG. 2, the vehicle 1B includes the information processing apparatus 100B and an in-vehicle sensor 200B. Here, a focus is placed on assisting the travel of the vehicle 1A. Thus, a vehicle control device and so on in the vehicle 1B are not illustrated although the vehicle 1B may have a configuration similar to that of the vehicle 1A described above. Conversely, the vehicle 1A may have a configuration similar to that of the vehicle 1B illustrated in FIG. 2.

The in-vehicle sensor 200B of the vehicle 1B is a sensor (such as an image sensor, a radar, or a LIDAR device) that senses, for example, an area outside (such as ahead of) the vehicle 1B within a range that includes up to the path of travel of an oncoming vehicle (the vehicle 1A). The in-vehicle sensor 200B forwards a sensing result obtained as a result of sensing the path of travel of the vehicle 1A to the information processing apparatus 100B.

The information processing apparatus 100B is constituted by a single electronic control unit (ECU) or a plurality of ECUs connected to each other via an in-vehicle network (such as a bus) in the vehicle 1B and functionally includes an obtaining unit 110B and a communication unit 120B. The information processing apparatus 100B may have a configuration similar to that of the information processing apparatus 100A described above. Conversely, the information processing apparatus 100A may have a configuration similar to that of the information processing apparatus 100B illustrated in FIG. 2.

The obtaining unit 110B is implemented by devices in an ECU, such as an input interface, and acquires a sensing result obtained from the in-vehicle sensor 200B.

The communication unit 120B is implemented by devices in an ECU, such as a communication circuit or a processor that executes a program. When a situation occurs in which another vehicle (in the illustrated example, the vehicle 1A) traveling within a predetermined short distance range (such as within several tens of meters) from the vehicle 1B fails to appropriately sense the path of travel, the communication unit 120B transmits a sensing result obtained from the in-vehicle sensor 200B to the other vehicle (i.e., the vehicle 1A). Specifically, upon receipt of a transmission request from the vehicle 1A, the communication unit 120B determines the occurrence of a situation in which the vehicle 1A fails to appropriately sense the path of travel and transmits a sensing result obtained from the in-vehicle sensor 200B, which is acquired by the obtaining unit 110B, to the vehicle 1A.

1.3 Example Image Captured by In-Vehicle Sensor 200A of Vehicle 1A

Figure 3A:
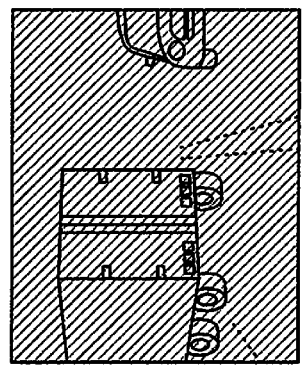
FIGS. 3A to 3C are diagrams illustrating example images captured by an image sensor mounted on a vehicle that enters a tunnel.
Figure 3B:
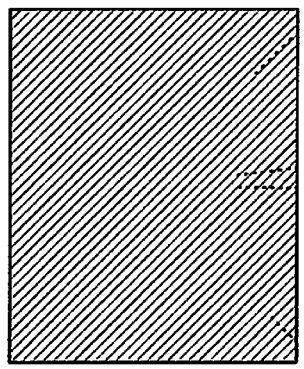
Figure 3C:
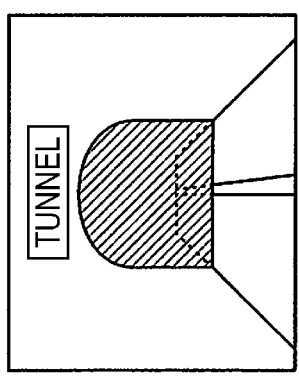

FIGS. 3A to 3C illustrate example images captured by the image sensor (the in-vehicle sensor 200A) of the vehicle 1A that enters the tunnel 10. FIGS. 3A, 3B, and 3C depict example images captured by the image sensor of the vehicle 1A in this order. It is to be noted that the image sensor also repeatedly captures images over periods between the three images.

FIG. 3A illustrates an image captured by the in-vehicle sensor 200A when the vehicle 1A is approaching the entrance/exit of the tunnel 10 from outside the tunnel 10 (i.e., an image generated through an imaging operation). For example, during the daytime period under fair weather conditions, the lighting inside the tunnel 10 is very dark compared with outside the tunnel 10, and any event inside the tunnel 10 is difficult to sufficiently recognize on an image captured from outside the tunnel 10. FIG. 3B illustrates an image captured by the in-vehicle sensor 200A immediately after the vehicle 1A has passed through the entrance/exit of the tunnel 10 and has entered the tunnel 10. Immediately after the vehicle 1A has entered the tunnel 10, due to the delay of adjustment with the automatic sensitivity adjustment function of the image sensor to a rapid change in brightness, the pixels of each image captured by the image sensor have very low luminance values, that is, dark images are generated. Such images make it difficult to appropriately detect an obstacle in the path of travel of the vehicle 1A through image analysis. FIG. 3C illustrates an image captured when a certain amount of time, such as ten and several seconds, has elapsed since the vehicle 1A passed through the entrance/exit of the tunnel 10 and entered the tunnel 10. From this image, which has sensitivity adjusted appropriately, an obstacle or the like (such as a failed vehicle) in the path of travel of the vehicle 1A can be appropriately detected through image analysis and the position, size, and so on of the obstacle or the like are detectable. Any image analysis technique may be used to detect an obstacle or the like from an image.

When the image illustrated in FIG. 3B is generated by the in-vehicle sensor 200A, it is not appropriate to generate, based on the image, travel assistance information for assisting the travel of the vehicle 1A. In this case, the information processing apparatus 100A of the vehicle 1A determines, based on the luminance value of each pixel or the like of the image, that the vehicle 1A is not in a normal state in which an image meeting predetermined criteria is obtainable, and transmits a transmission request to the vehicle 1B or the like to transmit a sensing result regarding the path of travel of the vehicle 1A. Then, the information processing apparatus 100A receives a sensing result from the vehicle 1B, for example, and uses the sensing result to generate travel assistance information. Thus, the information processing apparatus 100A can assist the travel of the vehicle 1A even during a period of time over which images such as the image illustrated in FIG. 3B are captured.

1.4 Operation of Information Processing Apparatus 100A

Figure 4:
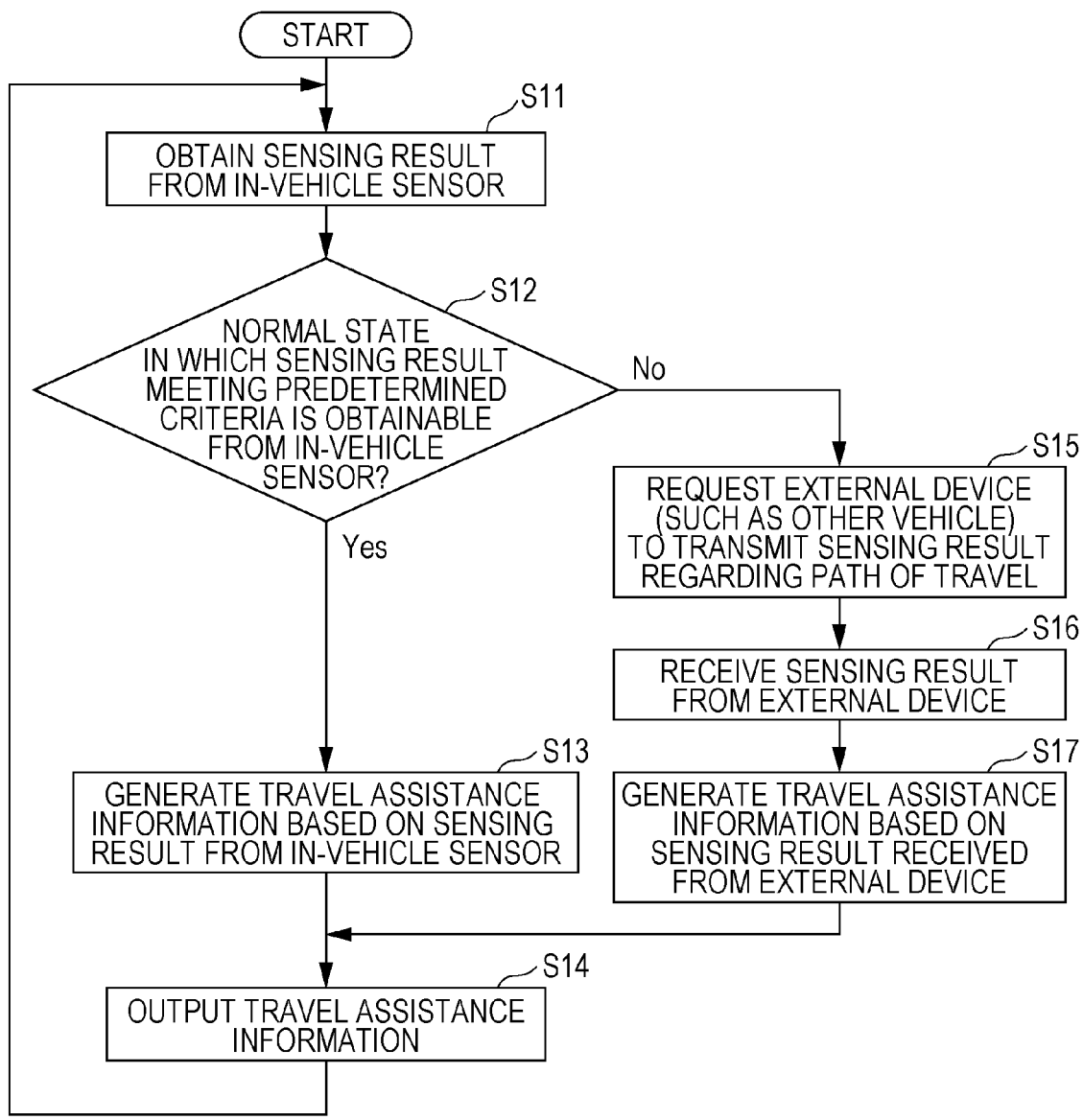
FIG. 4 is a flowchart illustrating an example of information processing for assisting the travel of a vehicle according to a first embodiment, which is performed by an information processing apparatus mounted on the vehicle.

FIG. 4 is a flowchart illustrating an example of information processing for assisting the travel of the vehicle 1A, which is performed by the information processing apparatus 100A. In the following, the operation of the information processing apparatus 100A will be described with reference to FIG. 4, taking an example in which the vehicle 1A enters the tunnel 10 during the daytime period under fair weather conditions (see FIG. 1).

The information processing apparatus 100A of the vehicle 1A obtains, by using the obtaining unit 110A, a sensing result (such as an image) from the in-vehicle sensor 200A (such as an image sensor) that senses the path of travel of the vehicle 1A (step S11).

Then, the information processing apparatus 100A determines, by using the determination unit 130, whether the vehicle 1A is in a normal state in which an image serving as a sensing result meeting predetermined criteria (for example, an appropriate image that is not too dark or too bright) is obtainable from the in-vehicle sensor 200A (step S12).

Before the vehicle 1A reaches the tunnel 10 or after a sufficient amount of time (such as ten and several seconds) has elapsed since the vehicle 1A passed through the entrance/exit of the tunnel 10, an image meeting the predetermined criteria (appropriate image) is obtainable from the in-vehicle sensor 200A. Thus, the vehicle 1A is determined to be in the normal state.

If it is determined in step S12 that the vehicle 1A is in the normal state, the information processing apparatus 100A performs, by using the generation unit 140, image processing based on the image serving as a sensing result obtained from the in-vehicle sensor 200A, which is acquired by the obtaining unit 110A, to detect an obstacle or the like and generates travel assistance information on the basis of the detection result (step S13). Then, the information processing apparatus 100A outputs, by using the output unit 150, the generated travel assistance information (for example, sends the travel assistance information to the vehicle control device 210 or displays the travel assistance information on a display) (step S14). Then, the process returns to step S11.

Immediately after the vehicle 1A has passed through the entrance/exit of the tunnel 10 and has entered a dark area from a bright area, an image meeting the predetermined criteria is not obtainable from the in-vehicle sensor 200A. Thus, the vehicle 1A is determined not to be in the normal state.

If it is determined in step S12 that the vehicle 1A is not in the normal state, the information processing apparatus 100A transmits, by using the communication unit 120A, a transmission request to an external device (such as the information processing apparatus 100B of the vehicle 1B, which is an oncoming vehicle) to transmit a sensing result regarding the path of travel of the vehicle 1A (step S15). In the vehicle 1B, in response to the transmission request, the information processing apparatus 100B transmits a sensing result obtained by the in-vehicle sensor 200B. Then, the communication unit 120A receives the sensing result transmitted from the vehicle 1B (step S16). Then, the generation unit 140 detects an obstacle or the like in the path of travel of the vehicle 1A on the basis of the sensing result received from the vehicle 1B (the information processing apparatus 100B) and generates travel assistance information indicating the detection result or the like (step S17). That is, if the determination unit 130 determines that the state of the vehicle 1A at a specific point in time is not the first state, the generation unit 140 generates first information without using the sensing result obtained from the sensor. Then, the information processing apparatus 100A outputs, by using the output unit 150, the generated travel assistance information (step S14). Then, the process returns to step S11.

In this way, even if the vehicle 1A is not in the normal state (the state in which an image serving as a sensing result meeting predetermined criteria is obtainable from the in-vehicle sensor 200A), that is, even if a sensing result from the in-vehicle sensor 200A has very low accuracy, the information processing apparatus 100A can appropriately generate travel assistance information by receiving a sensing result from an external device.

Second Embodiment

In the following, an embodiment will be described which is achieved by modifying a portion of the operation of the information processing apparatus 100A according to first embodiment described above.

2.1 System Configuration of Vehicle

In this embodiment, the system configuration of the vehicle 1A including the information processing apparatus 100A and the system configuration of the vehicle 1B, which is traveling near the vehicle 1A, are substantially similar to those in the first embodiment (see FIG. 2). Thus, the components of each vehicle are identified with the same numerals as those illustrated in FIG. 2 and are not described herein, if not necessary. That is, the configuration of the vehicle 1A and the vehicle 1B is identical to that in the first embodiment unless otherwise stated.

The first embodiment provides an example in which the information processing apparatus 100A determines whether the vehicle 1A is in a normal state in which a sensing result meeting predetermined criteria can be obtained on the basis of the luminance of each pixel of an image captured by an image sensor included in the in-vehicle sensor 200A and transmits a transmission request to an external device to transmit a sensing result if the vehicle 1A is not in the normal state. In this embodiment, in contrast, before determination based on the luminance of each pixel of an image captured by an image sensor, the information processing apparatus 100A determines whether the vehicle 1A is in a state in which it is difficult to obtain a sensing result meeting predetermined criteria by using a different method. If the vehicle 1A is in this state, the information processing apparatus 100A transmits a transmission request to an external device to transmit a sensing result.

2.2 Operation of Information Processing Apparatus 100A

Figure 5:
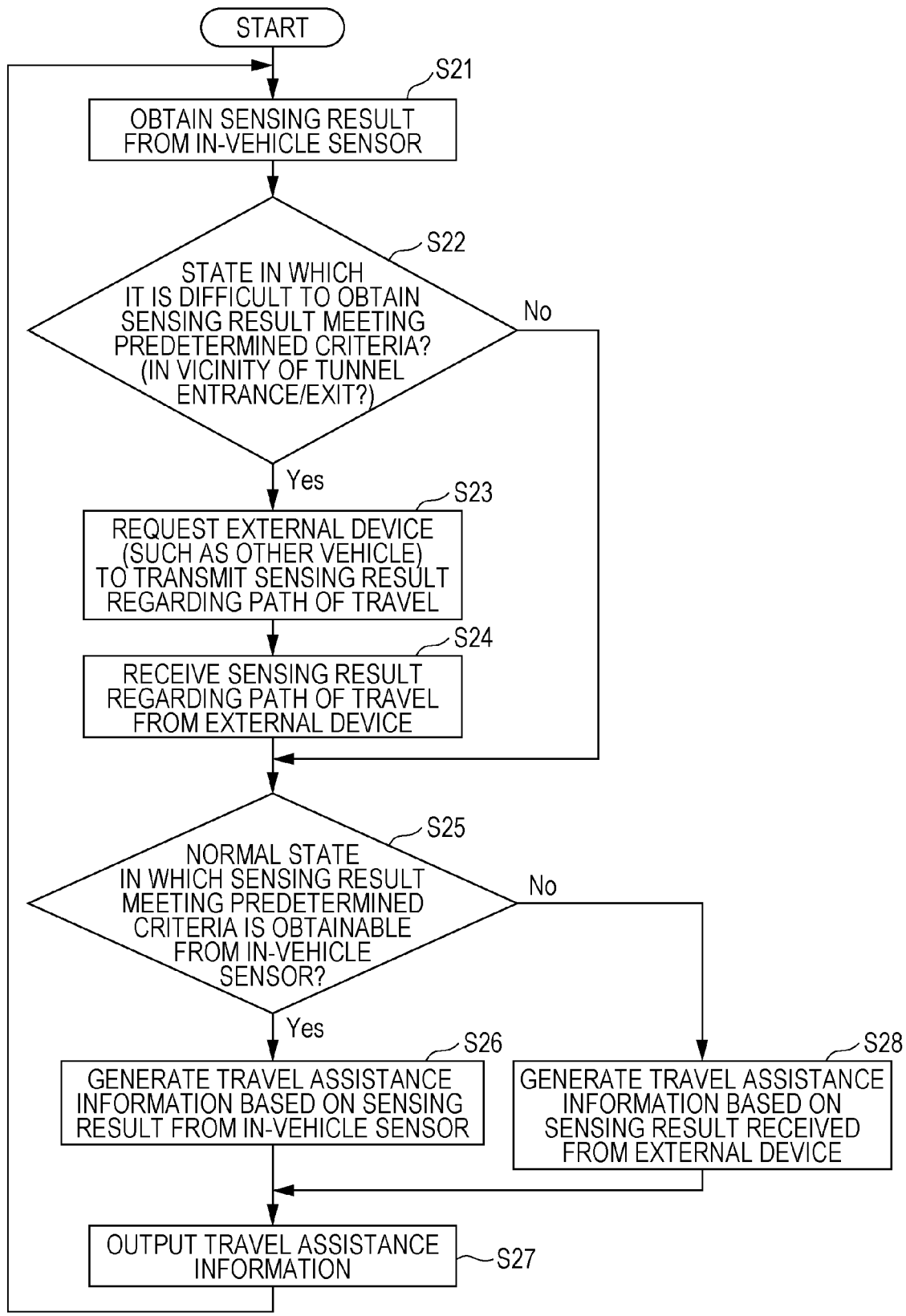
FIG. 5 is a flowchart illustrating an example of information processing for assisting the travel of a vehicle according to a second embodiment.

FIG. 5 is a flowchart illustrating an example of information processing for assisting the travel of the vehicle 1A, which is performed by the information processing apparatus 100A according to this embodiment. In the following, the operation of the information processing apparatus 100A will be described with reference to FIG. 5, taking an example in which the vehicle 1A enters the tunnel 10 during the daytime period under fair weather conditions (see FIG. 1).

The information processing apparatus 100A of the vehicle 1A obtains, by using the obtaining unit 110A, a sensing result (such as an image) from the in-vehicle sensor 200A (such as an image sensor) that senses the path of travel of the vehicle 1A (step S21).

The information processing apparatus 100A determines whether the vehicle 1A is in a state in which it is difficult to obtain an image serving as a sensing result meeting predetermined criteria from the in-vehicle sensor 200A (for example, whether the vehicle 1A is traveling in the vicinity of a boundary between two consecutive areas having largely different levels of brightness) (step S22). Specifically, the information processing apparatus 100A determines that the vehicle 1A is in a state in which it is difficult to obtain an image meeting predetermined criteria from the in-vehicle sensor 200A, for example, when the vehicle 1A is traveling in the vicinity of the entrance/exit of the tunnel 10. Whether the vehicle 1A is traveling in the vicinity of the entrance/exit of the tunnel 10 can be determined through, for example, image processing for comparing features extracted from an image generated by an image sensor with predetermined features of an image of the entrance/exit of the tunnel 10 (such as features about the appearance of the entrance/exit of a tunnel, as viewed from outside the tunnel, as illustrated in FIG. 3A). The determination may be based on whether the vehicle 1A is capable of receiving a beacon or the like emitted from a roadside device placed at the entrance/exit of the tunnel 10 by using short-range wireless communication technology. Alternatively, the determination may be performed by comparing a result of measuring the position of the vehicle 1A by using a position measurement sensor with position information (map information) indicating the position at which the entrance/exit of the tunnel 10 is located. That is, the determination of whether the vehicle 1A moves between the two areas described above includes determining whether the vehicle 1A is approaching the boundary between the two areas on the basis of a result of measuring the position of the vehicle 1A and position information indicating the positions at which the two areas are located. Accordingly, a sensing result received from an external device is obtained. This sensing result is necessary when it is determined in step S25, described below, that the vehicle 1A is not in a normal state in which a sensing result meeting the predetermined criteria is obtainable from the in-vehicle sensor 200A.

The determination of whether the vehicle 1A moves between the two areas described above may include determining whether the boundary between the two areas appears in an image indicated by image information obtained from the image sensor. For example, the information processing apparatus 100A determines that the vehicle 1A moves between the two areas if a tunnel appears in the image, and determines that the vehicle 1A does not move between the two areas if no tunnel appears in the image. Accordingly, the determination of whether the vehicle 1A moves across the boundary between the two areas can be performed by using an existing configuration, namely, by using an image sensor. As a result, an increase in cost can be suppressed.

If it is determined in step S22 that the vehicle 1A is in the state in which it is difficult to obtain an image meeting predetermined criteria from the in-vehicle sensor 200A, the information processing apparatus 100A transmits, by using the communication unit 120A, a transmission request to an external device (for example, the information processing apparatus 100B of the vehicle 1B) to transmit a sensing result regarding the path of travel of the vehicle 1A (step S23). Then, the communication unit 120A receives a sensing result transmitted from the vehicle 1B (step S24). If it is determined in step S22 that the vehicle 1A is not in the state in which it is difficult to obtain an image meeting predetermined criteria from the in-vehicle sensor 200A (such as if the vehicle 1A, which is traveling toward the tunnel 10, has not reached the vicinity of the entrance/exit of the tunnel 10), the information processing apparatus 100A skips the processing of steps S23 and S24.

The information processing apparatus 100A determines, by using the determination unit 130, whether the vehicle 1A is in a normal state in which an image serving as a sensing result meeting predetermined criteria (for example, an appropriate image that is not too dark or too bright) is obtainable from the in-vehicle sensor 200A (step S25). This determination is similar to the determination in step S12 described above in the first embodiment. In step S25, however, the information processing apparatus 100A may determine whether the vehicle 1A is in the normal state by using a method similar to that in the determination in step S22 described above without determining whether, for example, an image captured by the image sensor of the vehicle 1A is too bright or too dark. That is, the information processing apparatus 100A may perform the determination in step S25 as to whether the vehicle 1A is in the normal state by determining that the vehicle 1A is not in the normal state when it is determined that the vehicle 1A is in the state in which it is difficult to obtain an image meeting the predetermined criteria and determining that the vehicle 1A is in the normal state when it is determined that the vehicle 1A is not in the state in which it is difficult to obtain an image meeting the predetermined criteria.

As a result of the determination in step S25, if the vehicle 1A is in the normal state, the information processing apparatus 100A generates, by using the generation unit 140, travel assistance information on the basis of an image obtained from the in-vehicle sensor 200A (step S26) and outputs, by using the output unit 150, the travel assistance information (step S27). If the vehicle 1A is not in the normal state, the information processing apparatus 100A generates, by using the generation unit 140, travel assistance information on the basis of the sensing result received in step S24 from the external device (for example, the information processing apparatus 100B of the vehicle 1B) (step S28) and outputs, by using the output unit 150, the travel assistance information (step S27). After the information processing apparatus 100A outputs the travel assistance information in step S27, the process returns to step S21.

In this way, for example, when the vehicle 1A moves between areas having a large difference in brightness therebetween (i.e., the vehicle 1A is in a state in which it is expected to be difficult to obtain an image serving as a sensing result meeting predetermined criteria from that the in-vehicle sensor 200A), the information processing apparatus 100A transmits a transmission request to an external device (such as a vehicle, e.g., the vehicle 1B, or a roadside device) to transmit a sensing result regarding the path of travel of the vehicle 1A and receives a sensing result from the external device. Thus, even if an image serving as a sensing result meeting the predetermined criteria is no longer obtainable from the in-vehicle sensor 200A, the information processing apparatus 100A can generate appropriate travel assistance information by using the received sensing result. In addition, by waiting for a transmission request, the external device can transmit a sensing result only when necessary, which can prevent or reduce unnecessary communication.

Third Embodiment

In the following, another embodiment will be described which is achieved by modifying a portion of the operation of the information processing apparatus 100A according to first embodiment described above.
3.1 System Configuration of Vehicle Also in this embodiment, the system configuration of the vehicle 1A including the information processing apparatus 100A and the system configuration of the vehicle 1B, which is traveling near the vehicle 1A, are substantially similar to those in the first embodiment (see FIG. 2). Thus, the components of each vehicle are identified with the same numerals as those illustrated in FIG. 2 and are not described herein, if not necessary. That is, the configuration of the vehicle 1A and the vehicle 1B is identical to that in the first embodiment unless otherwise stated.

Figure 6:
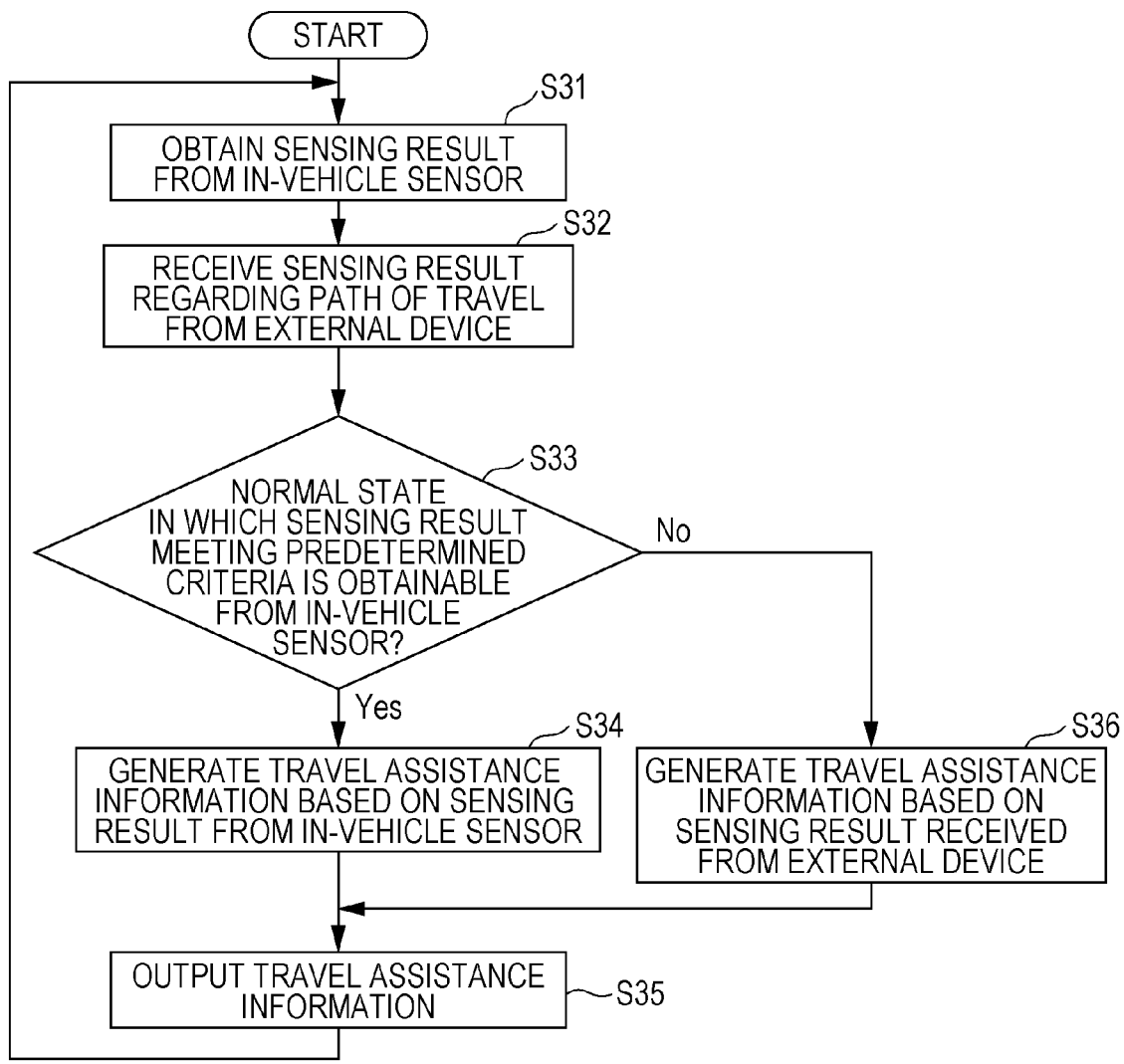
FIG. 6 is a flowchart illustrating an example of information processing for assisting the travel of a vehicle according to a third embodiment.

The first embodiment provides an example in which the information processing apparatus 100A determines whether the vehicle 1A is in a normal state in which a sensing result meeting predetermined criteria can be obtained on the basis of the luminance of each pixel of an image captured by an image sensor included in the in-vehicle sensor 200A, and transmits a transmission request to an external device to transmit a sensing result if the vehicle 1A is not in the normal state. In this embodiment, in contrast, the external device spontaneously transmits a sensing result and the information processing apparatus 100A receives the sensing result from the external device without transmitting a transmission request.
3.2 Operation of Information Processing Apparatus 100A FIG. 6 is a flowchart illustrating an example of information processing for assisting the travel of the vehicle 1A, which is performed by the information processing apparatus 100A according to this embodiment. In the following, the operation of the information processing apparatus 100A will be described with reference to FIG. 6, taking an example in which the vehicle 1A enters the tunnel 10 during the daytime period under fair weather conditions (see FIG. 1).

The information processing apparatus 100A of the vehicle 1A obtains, by using the obtaining unit 110A, a sensing result (such as an image) from the in-vehicle sensor 200A (such as an image sensor) that senses the path of travel of the vehicle 1A (step S31).

When a sensing result regarding the path of travel of the vehicle 1A is transmitted from an external device (a device such as a vehicle or a roadside device) by using short-range wireless communication technology, the information processing apparatus 100A receives the sensing result by using the communication unit 120A (step S32). The external device is assumed to be configured to transmit a sensing result obtained by sensing the vicinity of the entrance/exit of the tunnel 10. The transmission of a sensing result from the information processing apparatus 100B of the vehicle 1B as an external device will be described below with reference to FIG. 7. The external device may add additional information such as the position at which sensing is performed to a sensing result before transmitting the sensing result.

Then, the information processing apparatus 100A determines, by using the determination unit 130, whether the vehicle 1A is in a normal state in which an image serving as a sensing result meeting predetermined criteria (for example, an appropriate image that is not too dark or too bright) is obtainable from the in-vehicle sensor 200A (step S33).

Before the vehicle 1A reaches the tunnel 10 or after a sufficient amount of time (such as ten and several seconds) has elapsed since the vehicle 1A passed through the entrance/exit of the tunnel 10, an image meeting the predetermined criteria (appropriate image) is obtainable from the in-vehicle sensor 200A. Thus, the vehicle 1A is determined to be in the normal state.

If it is determined in step S33 that the vehicle 1A is in the normal state, the information processing apparatus 100A performs, by using the generation unit 140, image processing based on the image serving as a sensing result obtained from the in-vehicle sensor 200A, which is acquired by the obtaining unit 110A, to detect an obstacle or the like and generates travel assistance information on the basis of the detection result (step S34). Then, the information processing apparatus 100A outputs, by using the output unit 150, the generated travel assistance information (for example, sends the travel assistance information to the vehicle control device 210 or displays the travel assistance information on a display) (step S35). Then, the process returns to step S31.

Immediately after the vehicle 1A has passed through the entrance/exit of the tunnel 10 and has entered a dark area from a bright area, an image meeting the predetermined criteria is not obtainable from the in-vehicle sensor 200A. Thus, the vehicle 1A is determined not to be in the normal state.

If it is determined in step S33 that the vehicle 1A is not in the normal state, the information processing apparatus 100A detects an obstacle or the like in the path of travel of the vehicle 1A on the basis of the sensing result regarding the path of travel of the vehicle 1A, which is received by the communication unit 120A in step S32 from an external device (for example, the information processing apparatus 100B of the vehicle 1B, which is an oncoming vehicle), and generates travel assistance information indicating the detection result or the like (step S36). Then, the information processing apparatus 100A outputs, by using the output unit 150, the generated travel assistance information (step S35). Then, the process returns to step S31.

If the vehicle 1A, which is traveling toward the tunnel 10, has not reached the vicinity of the entrance/exit of the tunnel 10, the information processing apparatus 100A may fail to receive sensing result in step S32. This is because an appropriate image serving as a sensing result obtained by the in-vehicle sensor 200A, such as an image sensor, should be obtainable in this case, and then in step S34, travel assistance information can be generated as appropriate on the basis of the appropriate image (i.e., a sensing result meeting the predetermined criteria) from the in-vehicle sensor 200A to assist the travel of the vehicle 1A. It is useful for the vehicle 1A that travel assistance information is generated preferentially on the basis of a sensing result (such as an image) from the in-vehicle sensor 200A so long as a sensing result meeting the predetermined criteria (for example, an image captured by an image sensor) can be obtained from the in-vehicle sensor 200A.

3.3 Operation Etc. of Information Processing Apparatus 100B

In the following, the information processing apparatus 100B of the vehicle 1B, which is an oncoming vehicle ahead of the vehicle 1A (see FIG. 1), will be described.

When a situation occurs in which another vehicle (for example, the vehicle 1A) traveling nearby (for example, within a predetermined short distance range such as within several tens of meters) fails to appropriately sense the path of travel, the communication unit 120B of the information processing apparatus 100B of the vehicle 1B transmits a sensing result obtained from the in-vehicle sensor 200B to the other vehicle. In the first embodiment, the communication unit 120B determines that a situation occurs in which the vehicle 1A fails to appropriately sense the path of travel when a transmission request is received from the vehicle 1A (i.e., from the information processing apparatus 100A of the vehicle 1A), and transmits a sensing result obtained from the in-vehicle sensor 200B, which is acquired by the obtaining unit 110B, to the vehicle 1A. In this embodiment, in contrast, the communication unit 120B of the vehicle 1B determines that a situation occurs in which the vehicle 1A fails to appropriately sense the path of travel when the vehicle 1B approaches a boundary between two consecutive areas having a difference in brightness therebetween of greater than or equal to a predetermined level (here, by way of example, when the vehicle 1B approaches in the vicinity of the entrance/exit of the tunnel 10), and transmits a sensing result obtained from the in-vehicle sensor 200B. The sensing result may be transmitted only when an anomaly has occurred in the vicinity of the vehicle 1B or on the path of travel of the vehicle 1A. For example, the communication unit 120B of the vehicle 1B transmits a sensing result only when a motor vehicle accident, a collapse, or a traffic hold-up has occurred in the vicinity of the vehicle 1B or on the path of travel of the vehicle 1A. The presence or absence of sensing may be controlled depending on the occurrence of the anomaly.

The information processing apparatus 100B may use any method to determine whether the vehicle 1B, which is traveling in the tunnel 10, has approached in the vicinity of the entrance/exit of the tunnel 10. Whether the vehicle 1B has approached in the vicinity of the entrance/exit of the tunnel 10 can be determined through, for example, image processing for comparing features extracted from an image generated by an image sensor with predetermined features of an image of the entrance/exit of the tunnel 10 (such as features about the entrance/exit of a tunnel, as viewed from inside the tunnel). The information processing apparatus 100B may determine whether the vehicle 1B has approached in the vicinity of the entrance/exit of the tunnel 10 in accordance with whether the vehicle 1B is capable of receiving a beacon or the like emitted from a roadside device placed at the entrance/exit of the tunnel 10 by using short-range wireless communication technology. Alternatively, the determination may be performed by comparing a result of measuring the position of the vehicle 1B with position information (map information) indicating the position at which the entrance/exit of the tunnel 10 is located.

Figure 7:
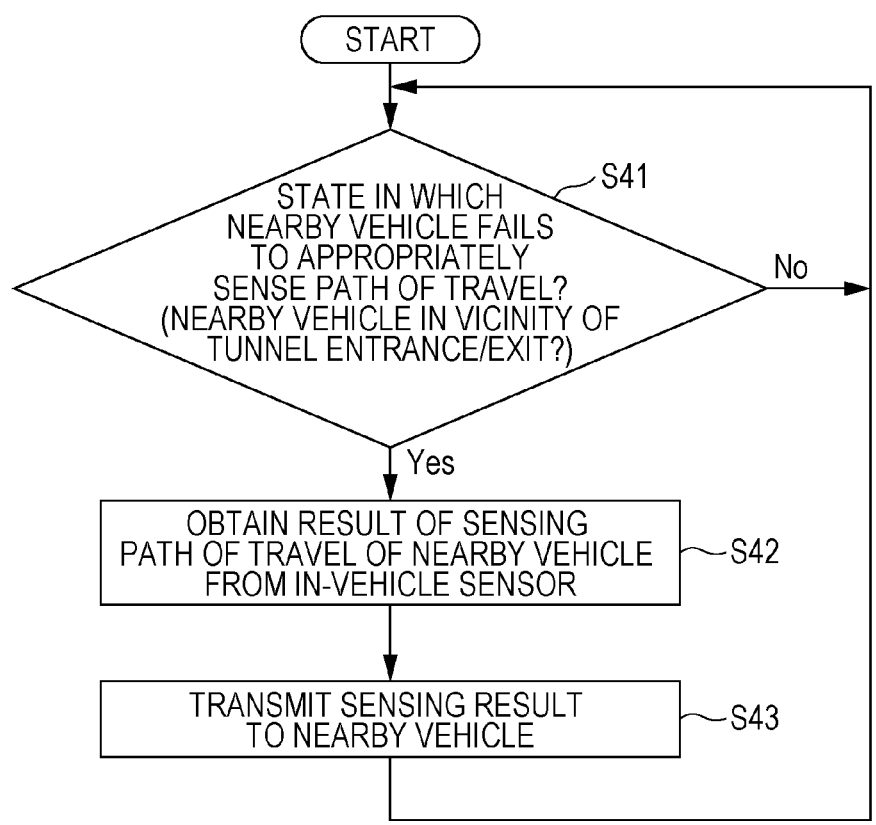
FIG. 7 is a flowchart illustrating an example process performed by an information processing apparatus mounted on a vehicle to assist the travel of another vehicle.

FIG. 7 is a flowchart illustrating an example process performed by the information processing apparatus 100B of the vehicle 1B to assist the travel of another vehicle. In the following, the operation of the information processing apparatus 100B will be described with reference to FIG. 7, taking an example in which the vehicle 1B, which is traveling in the tunnel 10, has approached in the vicinity of the entrance/exit of the tunnel 10 (see FIG. 1).

The information processing apparatus 100B of the vehicle 1B repeatedly determines whether a state has occurred in which a vehicle traveling nearby fails to appropriately sense the path of travel (step S41). For example, a boundary between areas having largely different levels of brightness may occur in the vicinity of the entrance/exit of the tunnel 10 and an image sensor of a vehicle that has passed through the boundary may not be able to temporarily generate an appropriate image (an image that is not too bright or too dark) immediately after the vehicle has passed through the boundary. To address this situation, as an example, when the vehicle 1B, which is traveling in the tunnel 10, approaches in the vicinity of the entrance/exit of the tunnel 10, the information processing apparatus 100B determines that a state has occurred in which a vehicle that is nearby the vehicle 1B (for example, the vehicle 1A) fails to appropriately sense the path of travel.

If it is determined in step S41 that the state has occurred in which a vehicle traveling nearby (for example, the vehicle 1A) fails to appropriately sense the path of travel, the information processing apparatus 100B obtains, by using the obtaining unit 110B, a result of sensing a range including the path of travel of the nearby vehicle (for example, the vehicle 1A) from the in-vehicle sensor 200B (step S42).

Then, the information processing apparatus 100B transmits, by using the communication unit 120B, the sensing result obtained in step S42 to the nearby vehicle by using short-range wireless communication technology (step S43).

In this embodiment, as such, the information processing apparatus 100B includes the obtaining unit 110B that obtains a sensing result regarding an environment external to the vehicle 1B from a first sensor included in the vehicle 1B or from a second sensor in the vicinity of the vehicle 1B, a determination unit that determines whether the state of the vehicle 1A at a specific point in time is a first state in which a sensing result obtained from a third sensor that is mounted on the vehicle 1A and that senses the path of travel of the vehicle 1A meets predetermined conditions, and the communication unit 120B that transmits the sensing result obtained by the obtaining unit 110B from the first sensor or the second sensor in response to determining that the state of the vehicle 1A at the specific point in time is not the first state. Specifically, the obtaining unit 110B obtains a sensing result regarding the path of travel of the vehicle 1B from the first sensor or the second sensor. The determination of whether the state of the vehicle 1A at the specific point in time is the first state includes determining whether the vehicle 1A moves across two consecutive areas having a difference in brightness therebetween of greater than or equal to a predetermined level. The communication unit 120B transmits the sensing result obtained from the first sensor or the second sensor in response to the vehicle 1B approaching the boundary between the two areas. The determination of whether the state of the vehicle 1A is the first state may include determining whether the communication unit 120B has received a request from the vehicle 1A to transmit a sensing result, and the communication unit 120B may transmit a sensing result obtained from the first sensor or the second sensor in response to receipt of the request from the vehicle 1A.

Accordingly, when the vehicle 1B, which is traveling inside the tunnel 10, has approached the entrance/exit of the tunnel 10, a sensing result obtained by the vehicle 1B (a sensing result) is transmitted from the vehicle 1B and the vehicle 1A, which is moving from outside the tunnel 10 to inside the tunnel 10, receives the sensing result. This configuration enables the information processing apparatus 100A of the vehicle 1A to receive a sensing result in step S32 illustrated in FIG. 6, and achieves appropriate travel assistance immediately after the vehicle 1A has entered the tunnel 10.

Modifications, Etc.

As described above, techniques according to the first to third embodiments of the present disclosure have been described for illustrative purposes. The techniques according to embodiments of the present disclosure are not limited to those in these embodiments, and are also applicable to embodiments in which modifications, replacements, additions, omissions, and so on are made as appropriate. For example, the following modifications are also included in embodiments of the present disclosure.

(1) The embodiments described above provide an example in which the information processing apparatus 100A determines whether the vehicle 1A is in a normal state (a state in which an image serving as a sensing result meeting predetermined criteria is obtainable from the in-vehicle sensor 200A) on the basis of the luminance values of an image generated by an image sensor in the in-vehicle sensor 200A. Another example is also provided in which the determination is performed, by estimation, on the basis of whether the vehicle 1A has approached in the vicinity of a tunnel entrance/exit. This example addresses a reduction in the quality of an image generated by an image sensor (such as the resolution of an object) due to a rapid change in brightness. However, such a rapid change in brightness may occur in cases other than when a vehicle travels in the vicinity of a tunnel entrance/exit. That is, the vehicle 1A is in a state different from the normal state when the vehicle 1A passes through the entrance/exit of a facility such as the tunnel 10, an underground parking lot, or an indoor parking lot (when the vehicle 1A enters the tunnel 10 or the like and exits the tunnel 10 or the like), when the vehicle 1A enters a bright area illuminated by a light from a dark area during the nighttime period, or when the vehicle 1A is suddenly illuminated by a light during the nighttime period (for example, by the headlights of an oncoming vehicle). Thus, the information processing apparatus 100A may determine whether the vehicle 1A is in the normal state on the basis of whether the vehicle 1A has approached the entrance/exit of an underground parking lot or an indoor parking lot. Likewise, the vehicle 1B according to the third embodiment may transmit a sensing result obtained by the in-vehicle sensor 200B to another vehicle when the other vehicle is estimated not to be in the normal state. The vehicle 1B may transmit the sensing result to another vehicle in cases such as when approaching the entrance/exit of an underground parking lot or the like, or when emitting high-intensity light (high beam) to an oncoming vehicle that is the other vehicle during the nighttime period from the headlights of the vehicle 1B. If the vehicle 1B has a body with a color that is less visible in dark environments, such as a black body, the vehicle 1B may transmit a sensing result including, for example, the position at which the vehicle 1B is located to a nearby vehicle while the vehicle 1B is traveling in a dark place. If the vehicle 1B has a body with a color that is likely to reflect light, such as a white body, the vehicle 1B may transmit a sensing result including, for example, the position at which the vehicle 1B is located to a nearby vehicle while the vehicle 1B is traveling in a bright place. This configuration enables the information processing apparatus 100A of the vehicle 1A to appropriately assist the travel of the vehicle 1A on the basis of a sensing result transmitted from the vehicle 1B so that the vehicle 1A will not collide with the vehicle 1B when the vehicle 1B is less likely to be visible to the vehicle 1A, which is an oncoming vehicle or the like traveling nearby.

(2) In the embodiments described above, if the determination unit 130 determines that the vehicle 1A is not in the normal state, the generation unit 140 of the information processing apparatus 100A generates travel assistance information on the basis of a sensing result received from an external device, rather than on the basis of an image serving as a sensing result from the in-vehicle sensor 200A. However, even if the vehicle 1A is not in the normal state, travel assistance information may be generated on the basis of both an image serving as a sensing result from the in-vehicle sensor 200A and a sensing result received from an external device. It is to be noted that, if the vehicle 1A is not in the normal state, it is useful to generate travel assistance information such that the effect of the sensing result obtained from the in-vehicle sensor 200A on the travel assistance information is reduced compared with if the determination unit 130 determines that the vehicle 1A is in the normal state. As a specific example, when the vehicle 1A is in the normal state, the information processing apparatus 100A may use only the sensing result (image) obtained from the in-vehicle sensor 200A or use both the sensing result (image) obtained from the in-vehicle sensor 200A and a sensing result received from an external device or, in some cases such as when both sensing results are contradictory, may preferentially use the sensing result from the in-vehicle sensor 200A. When the vehicle 1A is not in the normal state, the information processing apparatus 100A may use a sensing result received from an external device and a sensing result obtained from the in-vehicle sensor 200A in such a manner that, for example, the sensing result from the in-vehicle sensor 200A is assigned a lower weight by using a weighted average or, if both results are contradictory, may preferentially use the sensing result received from the external device. In this way, if the determination unit 130 determines that the state of the vehicle 1A at a specific point in time is not the first state, the generation unit 140 may also use a sensing result obtained from a sensor such that the effect of the sensing result from the sensor on the first information is reduced compared with when the determination unit 130 determines that the state of the vehicle 1A at the specific point in time is the first state.

(3) The embodiments described above provide an example in which the information processing apparatus 100A mounted on the vehicle 1A assists the travel of the vehicle 1A on the basis of a sensing result received from an external device when a sensing result obtained from a sensor mounted on the vehicle 1A is not appropriate, an example in which the information processing apparatus 100B mounted on the vehicle 1B transmits a sensing result obtained from a sensor mounted on the vehicle 1B to the vehicle 1A to assist the travel of the vehicle 1A, and other examples. Such an information processing apparatus may be an apparatus mountable on a moving object other than a vehicle (such as a moving robot). For example, the information processing apparatus 100A mounted on a moving object may generate, in a normal state in which a sensing result (for example, an image captured by an image sensor) meeting predetermined criteria is obtainable from a sensor mounted on the moving object (moving-object-mounted sensor), movement assistance information (such as travel assistance information) for assisting the movement (such as travel) of the moving object on the basis of the obtained sensing result, and in a state other than the normal state, may generate movement assistance information (such as travel assistance information) for assisting the movement (such as travel) of the moving object on the basis of a sensing result received from an external device. In another example, the information processing apparatus 100B mounted on a first moving object may transmit a sensing result obtained from a moving-object-mounted sensor in the first moving object (or a sensing result obtained from a device such as a roadside device in the vicinity of the first moving object, which is obtained by a sensor in the roadside device or the like) to a second moving object traveling nearby when a situation occurs in which the second moving object fails to appropriately sense the path of travel. The sensing result may be transmitted to the second moving object by transmitting information whose destinations are unknown (so-called broadcasting). That is, in the embodiments described above, the vehicle 1B may be a moving object (first moving object) other than a vehicle and the vehicle 1A may be a moving object (second moving object) other than a vehicle.

(4) The order in which various procedures of processes (such as the processing procedures illustrated in FIGS. 4 to 7) provided in the embodiments described above are executed is not limited to the order described above. The procedures may be executed in different order, a plurality of procedures may be performed in parallel, or some of the procedures may be omitted so long as such modifications or changes do not depart from the spirit and scope of the disclosure. Alternatively, the information processing apparatuses 100A and 100B may communicate with an external server device or any other suitable device to share some processes in an information processing method for a vehicle or the like (such as some of the steps in FIGS. 4 to 7) with the server device or the like. In addition, when a roadside device transmits a sensing result regarding the path of travel of the vehicle 1A in a way similar to that of the vehicle 1B, the roadside device may transmit the sensing result to the vehicle 1A via an external server device or any other suitable device.

(5) In the embodiments described above, the information processing apparatus 100A determines whether the vehicle 1A is in a normal state (a state in which a sensing result meeting predetermined criteria is obtainable from the in-vehicle sensor 200A) by using, for example, determination based on the pixel value of each pixel of an image generated by an image sensor through an imaging operation or determination based on whether the vehicle 1A is present in the vicinity of a boundary between areas having a large difference in brightness therebetween (such as in the vicinity of the entrance/exit of the tunnel 10). These examples focus on a temporary reduction in the quality of an image generated by an image sensor implemented as the in-vehicle sensor 200A through an imaging operation when the brightness suddenly changes. The accuracy of a sensing result obtained by an image sensor implemented as the in-vehicle sensor 200A may also be reduced when, for example, fog and/or heavy rain occurs in the path of travel of the vehicle 1A. To address weather conditions such as fog or heavy rain, the information processing apparatus 100A may be configured such that, as a result of the analysis of an image generated by an image sensor through an imaging operation, the vehicle 1A is determined not to be in the normal state, for example, when an object blurs due to the low resolution, or otherwise determined to be in the normal state. In addition, it may be specified that predetermined criteria are not met when the accuracy of sensing (monitoring) performed by a sensor other than an image sensor (such as a radar or a LIDAR device) implemented as the in-vehicle sensor 200A is reduced. That is, when the accuracy of sensing performed by the in-vehicle sensor 200A is reduced depending on the environment in which the vehicle 1A is traveling, the information processing apparatus 100A may determine that the vehicle 1A is not in the normal state, receive information (a sensing result) obtained as a result of sensing (monitoring) from an external device, and generate travel assistance information for assisting the travel of the vehicle 1A on the basis of the received sensing result.

(6) Each of the information processing apparatuses 100A and 100B according to the embodiments described above includes an ECU including a memory, a processor, and so on and the processor or the like executes a program (software) stored in the memory to implement various functions, by way of example but not limitation. The functions may be implemented by dedicated hardware (such as a digital circuit) without using software.

(7) Some or all of the constituent elements included in each device or apparatus according to the embodiments described above may be constituted by a single system large scale integration (LSI). The system LSI is a super-multi-functional LSI manufactured by integrating a plurality of configuration units on one chip, and is specifically a computer system configured to include a microprocessor, a ROM, a RAM, and so on. The RAM has recorded thereon a computer program. The microprocessor operates in accordance with the computer program, thereby allowing the system LSI to achieve its functions. In addition, the constituent elements included in each device or apparatus may be formed as individual chips or some or all of the constituent elements may be integrated into a single chip. The system LSI, which is used here, may be otherwise called an integrated circuit (IC), an LSI, a super LSI, or an ultra LSI depending on the degree of integration. In addition, a technique for forming an integrated circuit is not limited to the LSI and may be implemented by using a dedicated circuit or a general-purpose processor. A field programmable gate array (FPGA) that is programmable after the manufacture of the LSI or a reconfigurable processor in which the connection or setting of circuit cells in the LSI is reconfigurable may be used. Additionally, if a technique for forming an integrated circuit is introduced in place of the LSI along with development in semiconductor technology or other derivative technology, it is a matter of course that the technique may be used for the integration of functional blocks. One potential approach is to apply biotechnology, for example.

(8) Some or all of the constituent elements included in each device or apparatus may be constituted by an IC card removably set in each device or apparatus or by a stand-alone module. The IC card or the module is a computer system constituted by a microprocessor, a ROM, a RAM, and so on. The IC card or the module may include the super-multifunctional LSI described above. The microprocessor operates in accordance with the computer program, thereby allowing the IC card or the module to achieve its functions. The IC card or the module may be tamper-resistant.

(9) An embodiment of the present disclosure may provide, for example, an information processing method including all or some of the processing procedures illustrated in FIGS. 4 to 7, for example. For example, the information processing method is a method for controlling the travel of the vehicle 1A (moving object) and includes obtaining a sensing result from the in-vehicle sensor 200A (moving-object-mounted sensor) that senses the path of travel of the vehicle 1A (such as step S11), receiving a sensing result regarding the path of travel of the vehicle 1A from an external device outside the vehicle 1A (such as step S16), and generating, when the state of the vehicle 1A is a normal state in which a sensing result meeting the predetermined criteria is obtainable from the in-vehicle sensor 200A, travel assistance information, which is used to control the travel of the vehicle 1A, on the basis of the sensing result obtained from the in-vehicle sensor 200A and generating, when the state of the vehicle 1A is not the normal state, the travel assistance information on the basis of the sensing result received from the external device (such as steps S12, S13, and S17). Another embodiment of the present disclosure may provide a computer program that causes a computer to implement processing (operations) for the information processing method or a digital signal constituted by the computer program. Still another embodiment of the present disclosure may provide a computer-readable recording medium having recorded thereon the computer program or the digital signal, such as a flexible disk, a hard disk, a CD-ROM, a magneto-optical (MO) disk, a digital versatile disc (DVD), a DVD-ROM, a DVD-RAM, a Blu-ray (registered trademark) Disc (BD), or a semiconductor memory. Still another embodiment of the present disclosure may provide the digital signal recorded on the recording medium. In an embodiment of the present disclosure, the computer program or the digital signal may be transmitted via a telecommunication line, a wireless or wired communication line, a network such as the Internet, data broadcasting, or the like. Still another embodiment of the present disclosure may provide a computer system including a microprocessor and a memory, in which and the memory has recorded thereon the computer program described above and the microprocessor operates in accordance with the computer program. The program or the digital signal may be recorded on the recording medium which is transferred to another independent computer system, or the program or the digital signal may be transferred to another independent computer system via the network or the like, thereby allowing the independent computer system to implement the program.

(10) Embodiments achieved by any combination of constituent elements and functions illustrated in the embodiments described above and the modifications described above also fall within the scope of the present disclosure.

The present disclosure is available for assistance of the travel of a moving object such as a vehicle.

What is claimed is:

1. An apparatus comprising:
a processor; and
a memory storing thereon a computer program, which when executed by the processor, causes the processor to perform operations including:
obtaining a first sensing result from an image sensor that (i) is mounted on a moving object and (ii) senses a path of travel of the moving object, wherein the first sensing result includes image information;
receiving a second sensing result regarding the path of travel of the moving object from an external device which is apart from the moving object, wherein the second sensing result includes another image information;
determining whether a state of the moving object at a specific time is a first state or not;
generating first information for controlling movement of the moving object in accordance with the first sensing result in response to determining that the state of the moving object at the specific time is the first state;
generating second information for controlling movement of the moving object in accordance with the second sensing result received from the external device in response to determining that the state of the moving object at the specific time is not the first state; and
outputting the first information or the second information,
wherein the determining includes determining whether the moving object moves between two consecutive areas at the specific time, and
wherein a difference in brightness between the two consecutive areas is greater than or equal to a predetermined level.

2. The apparatus according to claim 1, wherein the determining of whether the moving object moves between the two consecutive areas includes determining, based on (i) a result of measuring a position of the moving object and (ii) position information indicating positions at which the two consecutive areas are located, whether the moving object is approaching a boundary between the two consecutive areas.

3. The apparatus according to claim 1, wherein the determining of whether the moving object moves between the two consecutive areas includes determining whether a boundary between the two consecutive areas appears in an image indicated by the image information obtained from the image sensor.

4. The apparatus according to claim 1, wherein, in the generating of the second information in response to determining that the state of the moving object at the specific time is not the first state, the second information is generated without using the first sensing result.

5. The apparatus according to claim 1, wherein the operations further include:
transmitting a request to transmit the second sensing result before or while the moving object moves between the two consecutive areas.

6. An apparatus comprising:
a processor; and
a memory storing thereon a computer program, which when executed by the processor, causes the processor to perform operations including:
obtaining a first sensing result from an image sensor that (i) is mounted on a moving object and (ii) senses a path of travel of the moving object, wherein the first sensing result includes image information;
receiving a second sensing result regarding the path of travel of the moving object from an external device which is apart from the moving object, wherein the second sensing result includes another image information;
determining whether a state of the moving object at a specific time is a first state or not;
generating first information for controlling movement of the moving object in accordance with the first sensing result in response to determining that the state of the moving object at the specific time is the first state;
generating second information for controlling movement of the moving object in accordance with the second sensing result received from the external device in response to determining that the state of the moving object at the specific time is not the first state; and outputting the first information or the second information, wherein the determining includes comparing a result of statistical processing of a pixel value of an image generated by the image sensor as the first sensing result with a threshold.

7. The apparatus according to claim 6, wherein, in the determining, the state of the moving object is determined to be not the first state when a predetermined number of pixel values of an image generated by the image sensor are within a predetermined range, and wherein the state of the moving object is determined to be the first state when the predetermined number of pixel values exceed the predetermined range.

8. An apparatus comprising:

a processor; and a memory storing thereon a computer program, which when executed by the processor, causes the processor to perform operations including:

obtaining a first sensing result from an image sensor that (i) is mounted on a moving object and (ii) senses a path of travel of the moving object, wherein the first sensing result includes image information;

receiving a second sensing result regarding the path of travel of the moving object from an external device which is apart from the moving object, wherein the second sensing result includes another image information;

determining whether a state of the moving object at a specific time is a first state or not;

generating first information for controlling movement of the moving object in accordance with the first sensing result in response to determining that the state of the moving object at the specific time is the first state;

generating second information for controlling movement of the moving object in accordance with the second sensing result received from the external device in response to determining that the state of the moving object at the specific time is not the first state; and outputting the first information or the second information, wherein in the generating of the second information in response to determining that the state of the moving object at the specific time is not the first state, the second information in accordance with (i) the second sensing result and (ii) the first sensing result is generated, such that an effect of the first sensing result on the second information is reduced compared with the generating of the first information in response to determining that the state of the moving object at the specific time is the first state.

9. A method comprising:

obtaining a first sensing result from an image sensor that (i) is mounted on a moving object and (ii) senses a path of travel of the moving object, wherein the first sensing result includes image information;

receiving a second sensing result regarding the path of travel of the moving object from an external device which is apart from the moving object, wherein the second sensing result includes another image information;

determining whether a state of the moving object at a specific time is a first state or not;

generating first information for controlling movement of the moving object in accordance with the first sensing result in response to determining that the state of the moving object at the specific time is the first state; and generating second information in accordance with the second sensing result received from the external device in response to determining that the state of the moving object at the specific time is not the first state, wherein the determining includes determining whether the moving object moves between two consecutive areas at the specific time, and wherein a difference in brightness between the two consecutive areas is greater than or equal to a predetermined level.

10. A non-transitory recording medium storing thereon a computer program, which when executed by a processor, causes the processor to perform operations comprising:

obtaining a first sensing result from an image sensor that (i) is mounted on a moving object and (ii) senses a path of travel of the moving object, wherein the first sensing result includes image information;

receiving a second sensing result regarding the path of travel of the moving object from an external device which is apart from the moving object, wherein the second sensing result includes another image information;

determining whether a state of the moving object at a specific time is a first state or not;

generating first information for controlling movement of the moving object in accordance with the first sensing result in response to determining that the state of the moving object at the specific time is the first state; and generating second information in accordance with the second sensing result received from the external device in response to determining that the state of the moving object at the specific time is not the first state, wherein the determining includes determining whether the moving object moves between two consecutive areas at the specific time, and wherein a difference in brightness between the two consecutive areas is greater than or equal to a predetermined level.

11. An apparatus comprising:

a processor; and a memory storing thereon a computer program, which when executed by the processor, causes the processor to perform operations including:

obtaining a first sensing result regarding an environment external to a first moving object from a first sensor which is mounted on the first moving object or from a second sensor near the first moving object;

determining whether a state of a second moving object at a specific time is a first state in which a second sensing result obtained from a third sensor that (i) is mounted on the second moving object and (ii) senses a path of travel of the second moving object meets a predetermined condition; and transmitting the first sensing result in response to determining that the state of the second moving object at the specific time is not the first state, wherein the obtaining obtains the first sensing result regarding the path of travel of the second moving object from the first sensor or from the second sensor, wherein the determining includes determining whether the second moving object moves across two consecutive areas, and wherein a difference in brightness between the two consecutive areas is greater than or equal to a predetermined level.

12. The apparatus according to claim 11, wherein determining of whether the state of the second moving object at the specific time is the first state includes determining whether a request has been received from the second moving object to transmit the first sensing result, and wherein, in the transmitting, the first sensing result is transmitted when the request from the second moving object is received.

13. A method comprising:

obtaining a first sensing result from an image sensor that (i) is mounted on a moving object and (ii) senses a path of travel of the moving object, wherein the first sensing result includes image information;

receiving a second sensing result regarding the path of travel of the moving object from an external device which is apart from the moving object, wherein the second sensing result includes another image information;

determining whether a state of the moving object at a specific time is a first state or not;

generating first information for controlling movement of the moving object in accordance with the first sensing result in response to determining that the state of the moving object at the specific time is the first state;

generating second information for controlling movement of the moving object in accordance with the second sensing result received from the external device in response to determining that the state of the moving object at the specific time is not the first state; and outputting the first information or the second information, wherein the determining of whether the state of the moving object is the first state or not includes comparing a result of statistical processing of pixel values of an image generated by the image sensor as the first sensing result with a threshold.

14. A method comprising:

obtaining a first sensing result from an image sensor that (i) is mounted on a moving object and (ii) senses a path of travel of the moving object, wherein the first sensing result includes image information;

receiving a second sensing result regarding the path of travel of the moving object from an external device which is apart from the moving object, wherein the second sensing result includes another image information;

determining whether a state of the moving object at a specific time is a first state or not;

generating first information for controlling movement of the moving object in accordance with the first sensing result in response to determining that the state of the moving object at the specific time is the first state;

generating second information for controlling movement of the moving object in accordance with the second sensing result received from the external device in response to determining that the state of the moving object at the specific time is not the first state; and outputting the first information or the second information, wherein in the generating of the second information in response to determining that the state of the moving object at the specific time is not the first state, the second information in accordance with (i) the second sensing result and (ii) the first sensing result is generated, such that an effect of the first sensing result on the second information is reduced compared with the generating of the first information in response to determining that the state of the moving object at the specific time is the first state.

15. A method comprising:

obtaining a first sensing result regarding an environment external to a first moving object from a first sensor, which is mounted on the first moving object, or from a second sensor near the first moving object;

determining whether a state of a second moving object at a specific time is a first state in which a second sensing result obtained from a third sensor that (i) is mounted on the second moving object and (ii) senses a path of travel of the second moving object meets a predetermined condition; and transmitting the first sensing result in response to determining that the state of the second moving object at the specific time is not the first state, wherein the obtaining obtains the first sensing result regarding the path of travel of the second moving object from the first sensor or from the second sensor, wherein the determining includes determining whether the second moving object moves across two consecutive areas, and wherein a difference in brightness between the two consecutive areas is greater than or equal to a predetermined level.

* * * * *